United States Patent [19]
Uetake et al.

[11] Patent Number: 5,931,245
[45] Date of Patent: Aug. 3, 1999

[54] BATTERY CONTROL SYSTEM FOR ELECTRIC VEHICLE

[75] Inventors: Akihito Uetake; Issei Yamakoshi; Kunihiko Takagi, all of Suwa; Takeshi Seto, Nagano; Haruki Torizuka, Yokohama; Tamotsu Fukazawa, Yokohama; Shinji Okayama, Yokohama, all of Japan

[73] Assignees: Seiko Epson Corporation, Suwa; Tokyo R & D Co., Ltd., Yokohama, both of Japan

[21] Appl. No.: 08/836,188
[22] PCT Filed: Sep. 17, 1996
[86] PCT No.: PCT/JP96/02659
  § 371 Date: May 15, 1997
  § 102(e) Date: May 15, 1997
[87] PCT Pub. No.: WO97/10967
  PCT Pub. Date: Mar. 27, 1997

[30] Foreign Application Priority Data

Sep. 18, 1995 [JP] Japan ................................. 7-238875
Jan. 9, 1996 [JP] Japan ................................. 8-001820
Jan. 9, 1996 [JP] Japan ................................. 8-001831

[51] Int. Cl.$^6$ ............................................. B60K 1/04
[52] U.S. Cl. ......................... 180/65.8; 318/139; 361/79
[58] Field of Search ..................... 180/65.8; 318/139; 361/78, 79; 701/22; 320/118, 136

[56] References Cited

U.S. PATENT DOCUMENTS

| | | | |
|---|---|---|---|
| 4,277,737 | 7/1981 | Muller-Werth | 180/65.8 |
| 4,962,462 | 10/1990 | Fekete | 180/65.8 |
| 5,534,364 | 7/1996 | Watanabe et al. | 180/65.8 |
| 5,619,417 | 4/1997 | Kendall | 364/483 |
| 5,656,915 | 8/1997 | Eaves | 320/6 |
| 5,703,464 | 12/1997 | Karunasiri et al. | 180/65.8 |

*Primary Examiner*—Lanna Mai
*Assistant Examiner*—Michael Cuff
*Attorney, Agent, or Firm*—Kanesaka & Takeuchi

[57] ABSTRACT

A battery control system for an electric vehicle 1 which includes a propelling motor (7) and an electric power unit(10)for driving the motor comprises a plurality of discrete batteries (13a) to (13d) connected in series and outputting a predetermined motor voltage, a plurality of selection switches (25a) to (25h) which are provided corresponding in number to the discrete batteries(13a)to (13d) and selectively connect one of the discrete batteries (13a) to (13d) in parallel to a control circuit (16), a judging device (23) which determines a state of electric energy possessed by each of the discrete batteries (13a) to (13d) and a control device (23) which selects one of the discrete batteries(13a) to (13h) having a maximum energy based on the state of electric energy as determined by the judging device and activates one of the corresponding selection switches (25a) to (25h) accordingly, and a control stabilization circuit (24) provided between the selection switches (25a) to (25h) and the control circuit (16) to thereby supply a stable power to the control circuit from the selected battery.

6 Claims, 29 Drawing Sheets

BATTERY CONTROL SYSTEM FOR ELECTRIC VEHICLE

TECHNICAL FIELD

The present invention relates to a safety mechanism used for an electric vehicle, more particularly a safety mechanism of an electric power unit to supply electricity to a drive motor of the electric vehicle and to a group of control circuits mounted on the vehicle; and specifically relates to a safety mechanism for the electric power unit itself, a safety mechanism for control units such as a running-prohibiting unit and a regenerative brake related to the power supply from the electric power unit, a safety mechanism for remedying disadvantages resulting from the mounting of a relatively heavy electric power unit, e.g., a safety mechanism for a main stand unit for easy operation of a center stand of a two-wheeled vehicle, a safety mechanism for a rear wheel driving mechanism by which an unsprung weight can be decreased, and a safety mechanism by which heat from circuits can be used effectively and a battery can be changed safely and easily.

BACKGROUND ART

SUMMARY OF THE BACKGROUND ART

As a next-generation alternative vehicle for internal combustion engine vehicles such as gasoline automobiles, an electric vehicle using a propelling electric motor is attracting attention. It is said that the electric vehicle which uses a clean electric energy can completely remedy the environmental problems such as harmful noises and exhaust gases, which are about 70% of the causes for the environmental pollution, derived from the internal combustion engine vehicles, and can extend by two times or more the resource life of fossil fuel such as petroleum.

The electric vehicle has propelling wheels which are suspended by shock absorbers from the vehicle body in the same way as a conventional gasoline automobile and is propelled by a power transmission device with an electric motor as the drive source. And, the electric motor has power supplied by an electric power unit.

Thus, the electric vehicle is quite different from conventional automobiles on the point that it has relatively heavy batteries. And, new issues are arising because of these batteries.

In other words, this electric power unit for supplying electricity to the electric motor has a plurality of storage batteries to form a battery power supply unit, and consists of a stability circuit for stably supplying output from the battery power supply unit, an electric motor for propelling, a motor drive circuit for directly controlling the motor revolution, and a control circuit for outputting a speed command or a torque command to the motor drive circuit. And, the motor-driven power from the motor is transmitted to the propelling wheels via a power transmission in the same way as a conventional vehicle.

As described above, the electric vehicle gets the motor-driven power from a plurality of batteries, and the performance of low-powered batteries becomes predominant, an expected traveling distance cannot be obtained, e.g., the electric vehicle cannot restart after temporarily stopping to wait at traffic lights, thus an unexpected stop is caused, possibly resulting in quite a danger. Therefore, a safety mechanism for the electric vehicle has been demanded to uniformly discharge the respective batteries while they are being used and to promote an efficient use of the electric power unit, thereby increasing a distance that the vehicle can travel.

On the other hand, it is advantageous to increase the battery capacity as much as possible in view of increasing mileage. But, when the electric power unit is compact and mounted close to the driver of the electric vehicle, especially an electric two-wheeled vehicle, insulation between the electric power unit and the driver is demanded as a safety mechanism for the electric vehicle.

And, the respective batteries of the electric power unit are recharged from an external power supply through a charging cord. It is quite dangerous if the electric vehicle moves while it is being recharged or moves without housing the charging cord even after finishing recharging. In view of the necessity of recharging the electric power unit, the structure around the charging cord is demanded as a safety mechanism for the electric vehicle.

As described above, the electric power unit is relatively heavy, and it is demanded to keep the stable running of the vehicle when the brakes are applied while it is running. And, since it is demanded to increase mileage as described above, it is advantageous to supply the electric power unit with regenerative electric power generated while braking. Thus, since the electric power unit is used, it is demanded to provide a regenerative brake and the stability of running as a safety mechanism for the electric vehicle.

Besides, the weight of the electric power unit cannot be disregarded in view of a weight balance, especially, in connection with the electric two-wheeled vehicle. Generally, the electric two-wheeled vehicle has a main stand, and it is demanded to make the vehicle stable when its stand is operated and to decrease an unsprung weight of wheels to provide stability while the electric two-wheeled vehicle is running as a safety mechanism for the electric vehicle.

Furthermore, since a drive circuit and a charger for the electric power unit generate heat due to charging and discharging as described above, it is demanded that their positions are decided in view of other devices and the batteries are detachable safely and easily for replacement or other purposes, as a safety mechanism for the electric vehicle. Detailed description will be made below.

DETAILS OF THE BACKGROUND ART

Generally, the battery power supply unit of the electric power unit for supplying electricity to the propelling motor is a combined battery unit, namely a set of coupled-batteries having a plurality of batteries or a plurality of groups of batteries, each consisting of a plurality of batteries, which are connected in series, and mounted to provide a predetermined voltage for the propelling motor.

In the electric power unit for supplying electric power to the propelling motor, the "battery power supply unit" means a whole set of batteries forming the power source. An "auxiliary battery" to be described afterward is a battery for supplementing the battery power supply unit for a voltage drop. And, since the battery power supply unit is formed of a plurality of batteries or a plurality of groups of batteries connected in combination, the "set of coupled-batteries" means a combination of a plurality of discrete batteries or a plurality of discrete groups of batteries, each group consisting of a plurality of batteries.

The batteries forming the battery power supply unit have the following characteristics. Specifically, with the elapsing time of using the batteries to discharge them, the terminal voltage of the batteries lowers gradually to form a discharge curve as shown in FIG. 28. And, the battery discharge is stopped before the voltage drop reaches a final discharge voltage at the leading end of the curve to protect the batteries. And, as shown in FIG. 29, it is known that discharge curve characteristics are variable depending on the used current, and dischargeable time is variable depending on the used current. Accordingly, a remaining capacity meter based on various methods of use is required to accurately indicate an amount of electrical energy remained in the batteries.

Such methods are known to include a method of judging in view of a drop rate of the terminal voltage of the battery power supply unit, a method of judging by adding up the discharged current, and a method of calculating an internal resistance from the terminal voltage and the current and predicting with reference to the increase of the internal resistance or its increase rate. Such a remaining capacity meter is mounted on the electric vehicle to predict the remained capacity in the battery power supply unit and to indicate a trafficable distance on the instrument panel to notify the driver of the electric vehicle.

Electric power from the battery power supply unit has its voltage stabilized by a stabilizing circuit, and then it is supplied to respective mounted equipment such as a motor through a feeder which is not illustrated. And, the voltage to be supplied is basically fed for the motor and set at a relatively high level. A voltage of 12 V or 24 V needed for operating the head lamps, horn and control circuits mounted on the electric vehicle is obtained by converting such a high voltage by a DC/DC converter.

And, this main electric power is supplied to the motor through the motor drive circuit, and an effective voltage to the motor is increased or decreased by the chopper control of the motor drive circuit to control the output of the propelling motor. A duty ratio of the chopper control to increase or decrease the voltage is instructed from the control circuit, and the control circuit is electrically connected to an accelerator. Therefore, the duty ratio is determined by the control circuit corresponding to the accelerator opening by the driver, and the motor drive circuit increases or decreases the effective voltage to be supplied to the motor according to the duty ratio to make the output operation of the motor corresponding to the accelerator opening, thus a required vehicle running speed is obtained.

However, in the above-described conventional electric power unit, the discharging characteristic of each battery which forms the battery power supply unit is variable depending on an individual difference, degradation, temperature atmosphere and the like, and the remaining capacity is variable among the respective batteries through the discharge use. And, it is known that the voltage drop rate of a battery having a lowered capacity is greater than those of other batteries, and occurrence of nonuniform remaining capacities tend to increase. And, because of the nonuniformity, the respective batteries have nonuniform remaining capacities at the end of discharging, and even when they are fully recharged from such a state, the respective batteries have the nonuniform remaining capacity, thus the tendency of nonuniformity is not remedied.

On the other hand, the remaining capacity meter is mounted on the electric vehicle to predict the remained capacity in the battery power supply unit and to indicate a trafficable distance on the instrument panel to notify the driver of the electric vehicle as described above. But, this remaining capacity is based on a battery which has the minimum capacity among the plurality of batteries. Therefore, there was a disadvantage that the output of the battery power supply unit as the whole was limited because of the battery having the minimum capacity among these batteries. As a result, power energy of all batteries as the original battery power supply unit cannot be used, and there was a tendency that a trafficable distance cannot be increased. And, because of the nonuniformity, a charging and discharging load is applied to a certain battery, resulting in lowering the number of repeated recharging and discharging times. And, the performance as the battery is lowered.

And, since the motor output is lowered with the lowering of the voltage outputted by the battery power supply unit, the running performance of the vehicle is lowered. Thus, the battery output cannot be exerted to the maximum extent. And, accuracy of measuring the remaining capacity of the battery power supply unit is low, for example, when it is indicated that the battery power supply unit has a small amount of remaining capacity, its actual trafficable distance could not be seen accurately. Besides, when the mounted battery power supply unit has exhausted to discharge, it is necessary to tow the vehicle by another vehicle to a place where the battery power supply unit can be changed or recharged, involving troublesome recovering works.

Furthermore, works of checking a state of the electric power unit and the battery replacement have a disadvantage of involving a higher risk as the electric power unit has a higher voltage. Specifically, the battery power supply unit of, e.g., a conventional electric scooter, has a combined battery including a plurality of batteries connected in series, and its output voltage provides a DC voltage of 48 V. It is to be noted that this voltage is equivalent to an AC voltage of about 10 V.

In view of the above circumstances, the present invention effects that (1) the used state of each battery which forms the battery power supply unit is observed and electric power is supplied in parallel to other circuits from batteries having a margin of capacity, (2) the auxiliary battery is connected in series to supplement when the output voltage of the battery power supply unit lowers, and (3) a blocked battery which is set to a voltage not harmful to people and is connected by a conductor provided on a cover, to accomplish the objects (1 to 3) to provide a safety mechanism for the electric vehicle with various safety performances improved.

As described above, the battery for supplying electric power to the propelling motor is a combined battery having a plurality of batteries connected in series to obtain a predetermined voltage for the propelling motor.

And, the battery is recharged through a charging cord provided for the vehicle and connected to a home wall outlet, as adopted for an electric two-wheeled vehicle. Specifically, the vehicle body is provided with a charging cord having a predetermined length. To recharge the battery, the charging cord is pulled out and connected to a home wall outlet. When the charging is completed, the charging cord is stored in the vehicle body.

To prevent the vehicle from moving when it is being charged, a running-prohibiting unit is mounted on the vehicle. As shown in FIG. 30, the running-prohibiting unit is configured by connecting a charger 17 in parallel with a feeder which is connected from a battery 13 to a motor 7 via a motor drive circuit 18, providing a relay switch 63 on the side of the motor from a point where the charger 17 is connected, and connecting the relay switch 63 to the charger 17. The charger 17 converts a voltage for domestic use into a battery charging voltage to charge the battery 13, and it has a charging cord 61 which can be extended to a predetermined length. And, a plug 62, which is plugged into a home wall outlet, is provided at the leading end of the charging cord 61.

The relay switch 63 is a relay switch which is opened when a driving electric current is supplied. Therefore, since the charging electric current is supplied from the charger 17 to the battery 13 and the driving electric current is supplied to the relay switch 63 as well while charging, the relay switch 63 operates to disconnect the feeder from at least the battery 13 to the propelling motor 7.

Reference numeral 124 denotes a DC/DC converter which is connected in parallel to the feeder and converts the battery voltage into the voltages for respective circuits to supply thereto. Namely, the DC/DC converter 124 also supplies the electric current at a predetermined voltage to a motor control circuit 25 shown in the drawing. And, the motor control circuit 125 is connected to a running control circuit (not shown) into which an accelerator signal or the like is entered, and according to the running command signal from the running control circuit, a motor control signal in a running/regenerative mode is outputted to the motor drive circuit 18.

Therefore, a charging operation signal is outputted from the charger 17 while charging with the charging cord 61 which is connected to the charger 17 connected to a home wall outlet, and according to this operation signal, the relay switch 63 provided on the feeder is turned off, the driving electric current is not supplied from the battery 13 to various circuits including the motor drive circuit 18 and the motor control circuit 125, and even when a main switch 9 is turned on, the vehicle is prohibited from moving when it is being charged. Reference numeral 9a denotes a key switch interlocked with the main switch 9 to turn on/off the motor control circuit 125.

And, the charging cord 61 is stored compact into a cord case 71 which is formed in substantially cylindrical shape as shown in FIG. 31. And, this cord case 71 is provided with a storing mechanism to automatically retract the pulled-out charging cord 61 and a lock mechanism to hold the cord in the pulled-out state.

Specifically, the cord case 71 comprises a case body 72 and a cover case 73, and a cord reel 74 for winding the charging cord 61 to house thereon is accommodated in these cases as shown in FIG. 32 and FIG. 33. Reference numeral 72a denotes a center axis, 72b an opening, and 72c an engaging notch.

The charging cord 61 is a double conductor cord having a predetermined length with its base ends fixed to the cord reel and its leading end provided with the plug 62 having a predetermined shape to be inserted into a home wall outlet. And, rotating contact pieces 61a made of a conducting material are projected toward the case at the base ends of the charging cord 61. And, to correspond to the rotating contact pieces 61a, the cover case 73 is provided with two stationary contacts 73a which are made of a conductive material and formed into rings having a different diameter. Reference 73b denotes a connection terminal which is externally protruded from the case and connected to the stationary contacts 73a.

The above-described storing mechanism has a coil spring 75 to turn the cord reel 74 in the retracting direction when the charging cord 61 is pulled out, thereby automatically retracting the cord. In other words, this coil spring 75 is formed of a leaf spring which is made of an elastically deformable material and shaped in a spiral with intervals, its one end at the inner periphery is fixed to the case, and the end at the outer periphery is fixed to the cord reel. Therefore, when the charging cord 61 is pulled out of the cord case 71 in order to recharge, the cord reel 74 on which the charging cord 61 is wound turns in one direction, the coil spring 75 is elastically deformed and wound, and the coil spring 75 accumulates energy to rotatably push the cord reel 74 in a storing direction.

And, the lock mechanism to hold the charging cord 61 in the pulled-out state comprises the engaging notch 72c which is slantingly formed from the center toward the outside of the case body 72 and a claw (not shown) formed on the cord reel 74 to correspond to the engaging notch 72c. When the pulled-out charging cord 61 is relatively slowly retracted, the claw of the cord reel 74 catches the engaging notch 72c of the case body 72, and the charging cord 61 is locked in the pulled-out state. And, when the charging cord 61 in this state is further pulled out to release the engagement of the engaging notch 72c of the case body 72 with the claw of the cord reel 74 and suddenly freed, it is automatically rewound into the cord case 71 by means of the coil spring 75.

With the above-described conventional running-prohibiting unit, a vehicle can be prevented from running while it is being charged with a charging current flowing from the household power supply to the battery, but since the storage condition of the charging cord itself is not judged, there is a possibility that the vehicle may be driven without storing the charging cord, and safety can not be secured fully.

For example, in case of a power failure or a physical cut of the charging cord, the external supply of power is cut even when the charging cord is connected, the charger is turned off and the relay switch is turned on, allowing the vehicle to run. And, if the charging cord is not stored after charging, the vehicle also becomes in a state of runnable.

Such an electric vehicle is provided with a regenerative brake in addition to the mechanical brakes similar to those of conventional vehicles. The regenerative brake temporarily uses the propelling motor as a generator to convert the kinetic energy of the vehicle into the electrical energy and absorb it. In other words, the kinetic energy to be lowered at the time of decelerating the vehicle is converted into the electrical energy by generating by the propelling motor, and the electrical energy is used to recharge the battery, thereby recovering the energy. And, in the case of such regenerative recharging, since the generated voltage is a relatively low voltage of about 1.8 V, the motor drive circuit is operated as a voltage raising circuit or connected to a dedicated voltage raising circuit to raise the voltage to a level higher than the battery terminal voltage at the time before recharging the battery.

And, such migration to the regenerative mode operation of the motor drive circuit is performed by a command from the control circuit which is connected to the accelerator. In other words, when the accelerator opening is decreased by the driver, the travelling speed is lowered gradually, but when the accelerator opening becomes zero, the motor control falls in a regeneration mode, and the regenerative braking by the motor is performed.

The above-described conventional regenerative braking device for an electric two-wheeled vehicle or three-wheeled vehicle is set to a fixed braking force equivalent to that of the engine brake of the conventional gasoline engine vehicle in terms of safety and feeling. In other words, the regenerative braking force is always set to a given level, and when the mechanical braking is enhanced, the brake ratio by the regenerative brake is decreased with respect to the enhanced mechanical brake.

And, since the regenerative current is limited to a determined level in view of the same reason, sufficient regenerative recharging is not easily performed even when the battery can be recharged fully, resulting in a disadvantage that a trafficable distance of the vehicle cannot be expanded.

Besides, when braking operation is conducted for the front wheel only, a braking balance in the lengthwise direction of the vehicle is deteriorated, and a sufficient travelling safety cannot be obtained. For example, when an inexperienced driver operates the front brake only, the front wheel only is locked and slips, possibly resulting in falling.

In view of above, the present invention (4) detects that the charging cord has been housed without fail, (5) proposes a running-prohibiting unit which allows to run only when the stand has been retracted, and (6) controls the operation of the regenerative brake when the brake is operated, to propose a regenerative brake with its braking performance and regenerative performance improved and to accomplish the objects (4 to 6) to provide an electric vehicle with various control performances improved.

Generally, an electric vehicle, particularly an electric two-wheeled vehicle, provided with a propelling motor and an electric power unit for operating the motor, has propelling wheels which are suspended by shock absorbers from the vehicle body in the same way as a conventional motor bike or scooter, the propelling wheels are driven by a power transmission device with the motor as a drive source, and the motor receives electric power from an electric power device having a battery. And, a motor-driven power produced by the motor is transmitted to the propelling wheel via a transmission in the same way as prior art to run the vehicle.

The power transmission device comprises a motor and a transmission for decelerating the motor output to an appropriate revolution torque and for transmitting to the rear wheel, the motor is housed in a motor case, the transmission is also housed in a cover case, and the cover case is fixed to the motor case. And, the power transmission device has a bracket provided at the front of the motor case or cover case with respect to the vehicle body fitted to a bracket provided on the vehicle body frame via a pivot shaft, and can oscillate about the pivot shaft. And, the power transmission device with its part on the side of the rear wheel connected to the vehicle body frame through a cushioning cylinder.

The electric power device comprises a battery power supply unit fixed at the center of the vehicle body, a motor drive circuit and a charger separately provided on both sides of the battery power supply unit, an electric power circuit mounted at the rear of the vehicle body, and a control circuit. And, an electric current discharged from the battery power supply unit is stabilized by the electric power circuit, adjusted to electric power corresponding to the operation of the accelerator through the motor drive circuit, and supplied to the propelling motor. The control of current flow through the motor drive circuit is performed based on a command from the control circuit electrically connected to the accelerator.

The battery power supply unit comprises a plurality of batteries connected in series to obtain a predetermined discharge voltage. And, when these batteries are discharged to exhaust, they are recharged by the charger from an external power supply. And, heating involved in the operation of these motor drive circuits or the charger is transmitted to the battery power supply unit to appropriately heat the batteries in the battery power supply unit and to chemically activate the batteries, thereby exerting a sufficient charging/discharging performance.

And, the electric power stabilized by the electric power circuit is supplied to the motor through the motor drive circuit. And, the motor supply voltage is increased or decreased by the current flow control adopting chopper control of the motor drive circuit, to control a motor speed. A command signal for the current flow control is outputted from the control circuit, and the control circuit is electrically connected to an accelerator grip. Therefore, the control circuit determines and outputs an appropriate motor output command value depending on the accelerator operation by the driver, the motor drive circuit increases or decreases an effective voltage to be supplied to the motor according to the command signal, so that the motor output can be obtained according to the accelerator opening.

Besides, a main stand which is designed to have at least two points come in contact with the ground upon being activated in the neighborhood of the rear wheel of the electric two-wheeled vehicle. To park the vehicle, the stand is erected at a grounding position to stabilize the vehicle body with a three-point contact of the front wheel and the stand with the ground.

This electric two-wheeled vehicle had a disadvantage that its convenience as the two-wheeled vehicle is deteriorated due to the increase of its weight as compared with a conventional scooter with an internal combustion engine. In other words, the electric two-wheel vehicle is relatively heavy and its handling by human power is not easy because of the plurality of batteries mounted. The batteries occupy about 40% of the weight of the vehicle. For example, the weight of a common gasoline scooter is 60 Kg, while the electric scooter is 117 Kg, in which 46 Kg is the battery-related weight.

Accordingly, there was a disadvantage that it is hard to operate the stand by human power in order to park the vehicle because its weight was increased. Therefore, there has been proposed a stand device which is provided with a motor mechanism or a hydraulic mechanism which is used to operate or release a dedicated stand, thereby decreasing a load based on human power. But, such a stand device has a complex structure leading to a cost increase, and using it also increases the weight, causing a disadvantage that the running performance is lowered.

Therefore, the present invention aims to provide (7) a safety mechanism for an electric vehicle which is provided with a stand mechanism for decreasing a load of human power to operate the stand.

Meanwhile, since the above-described electric two-wheeled vehicle such as a scooter has a high vibrating load which is applied to the motor, the motor is required to have a sufficient strength in rigidity, and there are disadvantages that the weight or the cost cannot be lowered. In other words, the motor and other drive mechanisms are mounted on the vehicle body via brackets provided on the motor case and buffer-operated with the pivot shaft of the bracket as the oscillation center, so that the motor is disposed below an oscillating fulcrum, a so-called unsprung weight is increased to also increase a load to be applied to the shock absorber and the running performance is lowered, and the motor itself tends to be vibrated due to the buffer operation.

Besides, since a fork pivot and the motor are added to a distance between the front and rear wheels, the wheelbase becomes unnecessarily long, resulting in disadvantages that the vehicle body and its turning radius are increased, making its handling difficult.

The present invention aims (8) to provide a safety mechanism for an electric vehicle so that the vibration of the motor during the buffer operation can be decreased, the running performance can be improved, and the wheelbase can be made short.

And, the conventional electric two-wheeled vehicle has the batteries of the battery power supply unit housed at the center of the vehicle body, and the vehicle body frame is on their both sides. Therefore, in the case of maintenance of replacing the batteries or inspection, the removal of the batteries is limited to upwards, making the battery replacing work troublesome.

In addition, since the motor drive circuit and the charger are separately provided on either side of the battery power supply unit, heat generated by these equipment cannot be utilized to heat uniformly the batteries of the battery power supply unit. In other words, since heating is made from one side and not given uniformly, heat radiation from the drive circuit and the charger was not utilized efficiently.

The present invention aims (9) to provide a safety mechanism for an electric vehicle that the batteries can be replaced with ease, and heat radiation from the drive circuit and the charger can be utilized efficiently.

SUMMARY OF THE INVENTION

The invention described in claim 1 of this application relates to a safety mechanism for an electric vehicle which includes a propelling motor and an electric power unit for driving the motor, comprising:

- a set of coupled-batteries forming the electric power unit, the set of coupled-batteries being formed of a plurality of discrete batteries or a plurality of groups of batteries, each group consisting of a plurality of batteries, connected in series and outputs a predetermined motor voltage;
- a plurality of selection switches which are provided corresponding in number to "the discrete batteries forming the set of coupled-batteries" or "the group of batteries forming the set of coupled-batteries", and selectively connect "the discrete batteries forming the set of coupled-batteries" or "the groups of batteries forming the set of coupled-batteries", respectively, in parallel to a control circuit group;
- judging means which determines a state of electric energy possessed by "the discrete batteries forming the set of coupled-batteries" or a state of electric energy possessed by "the groups of batteries forming the set of coupled-batteries", respectively; and
- control means which selects one of "the discrete batteries forming the set of coupled-batteries" or one of "the groups of batteries forming the set of coupled-batteries" having maximum energy based on the state of electric energy as determined by said judging means, and operates to connect the corresponding selection switch accordingly.

The invention described in claim 2 relates to the safety mechanism for an electric vehicle according to claim 1, wherein the judging means determines the state of electric energy in view of the output terminal voltages or remaining capacities of the respective batteries.

The invention described in claim 3 relates to the safety mechanism for an electric vehicle according to claim 1, wherein the judging means makes the judging process or the control means makes the selecting or connecting process on a predetermined time basis.

The invention described in claim 4 relates to a safety mechanism for an electric vehicle which includes a propelling motor and an electric power unit for driving the motor, comprising:

- a battery power supply unit which supplies electric power to the motor through a power supply line;
- a voltage detecting means which detects the drop of an output voltage of the battery power supply unit;
- an auxiliary battery which is connected in series to the power supply line via a connectable and releasable connecting means to supplement the voltage drop of the battery power supply unit; and
- a control means which outputs a connection signal to the connecting means based on a voltage drop signal from the voltage detecting means when the voltage of the battery power supply unit drops.

The invention described in claim 5 relates to a safety mechanism for an electric vehicle which includes a propelling motor and an electric power unit for driving the motor, comprising:

- a battery power supply unit which supplies electric power to the motor through a power supply line; and
- an auxiliary battery which is connected in series to the power supply line via a connectable and releasable connecting means to supplement the voltage drop of the battery power supply unit.

The invention described in claim 6 relates to the safety mechanism for an electric vehicle according to claim 4 or 5, wherein the battery power supply unit and the auxiliary battery are provided with a dedicated remaining capacity meter.

The invention described in claim 7 relates to a safety mechanism for an electric vehicle which includes a propelling motor and an electric power unit for driving the motor, wherein a case comprises a case body for storing a plurality of batteries configuring a power source and a case cover for covering the case body; and the case cover is provided with conductors for connecting the batteries to one another, for connecting a previously connected battery group with another battery group to one another, or for connecting any of the batteries with a previously connected battery group to one another.

The invention described in claim 8 relates to a safety mechanism for an electric vehicle which includes a propelling motor and an electric power unit for driving the motor, wherein:

- the electric vehicle is provided with a charger which charges a battery with a charging cord connected to an external power source;
- the charging cord is wound on a cord reel which is rotatably placed in a case and stored;
- a switch is provided to be turned on or off when the charging cord is stored or pulled out; and
- the switch is turned off as the charging cord is pulled out to electrically stop the motor from operating.

The invention described in claim 9 relates to the safety mechanism for an electric vehicle according to claim 8, wherein the switch is inserted into the power supply line running from the battery to the motor.

The invention described in claim 10 relates to the safety mechanism for an electric vehicle according to claim 8, wherein the switch is inserted into a control circuit of the motor.

The invention described in claim 11 relates to the safety mechanism for an electric vehicle according to claim 8, further comprising a perception means such as an alarm display which operates in the non-running state.

The invention described in claim 12 relates to a safety mechanism for an electric vehicle which includes a propelling motor and an electric power unit for driving the motor, comprising a regenerative braking device which temporarily uses the motor as a generator when the vehicle is being decelerated to convert the running kinetic energy of the vehicle into electrical energy;

the regenerative braking device including a deceleration detection means for detecting the deceleration of the vehicle, and a motor control circuit which is activated by a brake operation signal and determines an optimum regenerative braking force based on the detected deceleration of the vehicle.

The invention described in claim 13 relates to a safety mechanism for an electric vehicle which includes a propelling motor and an electric power unit for driving the motor, comprising a regenerative braking device which temporarily uses the motor as a generator when the vehicle is being decelerated to convert the running kinetic energy of the vehicle into electrical energy;

the regenerative braking device including an accelerator detection means for detecting the operation or not of the accelerator, a brake state detection means for detecting the operating states of the front and rear brakes, and a motor control circuit which is activated by an off signal from the accelerator detection means and determines an optimum regenerative braking force based on the front and rear braking force distribution detected by the brake state detection means.

The invention described in claim 14 relates to the safety mechanism for an electric vehicle according to claim 13, wherein the brake state detection means is selected from a group consisting of a sensor for detecting the tension of each brake wire, a sensor for detecting the reactions of brake levers, a piezoelectric sensor provided on the rotary spindles of brake levers, and a sensor for detecting the strokes of the front and rear suspensions.

The invention described in claim 15 relates to a safety mechanism for an electric vehicle which includes a propelling motor and an electric power unit for driving the motor, comprising a main stand pivotally mounted on the vehicle body and a battery case for storing batteries;

the battery case being provided to be movable with respect to the vehicle body when the main stand is erected.

The invention described in claim 16 relates to the safety mechanism for an electric vehicle according to claim 15, wherein the battery case is connected to the main stand through a link.

The invention described in claim 17 relates to a safety mechanism for an electric vehicle which includes a propelling motor and an electric power unit for driving the motor, comprising a main stand pivotally mounted on the vehicle body, a support arm pivotally provided on the vehicle body in front of the main stand, and a battery case for storing batteries;

the main stand and the support arm having pivoted parts at a point away from their pivoting fulcrums, and the battery case having mounting parts to be pivotally engaged with the pivoted parts; and the battery case being provided to be movable with respect to the vehicle body when the main stand is erected.

The invention described in claim 18 relates to the safety mechanism for an electric vehicle according to claim 17, wherein the pivoted parts of the main stand and the support arm are provided above the respective pivotable fulcrums, and the center of gravity of the battery case is moved in the lengthwise direction of the vehicle body when the main stand is erected.

The invention described in claim 19 relates to a safety mechanism for an electric vehicle which includes a propelling motor and an electric power unit for driving the motor, wherein a pivot shaft of a rear wheel driving mechanism is mounted on a main frame of a vehicle body, and the pivot shaft is provided substantially coaxial with the motor shaft of the motor.

The invention described in claim 20 relates to the safety mechanism for an electric vehicle according to claim 19, wherein the motor shaft of the motor serves as the pivot shaft.

The invention described in claim 21 relates to a safety mechanism for an electric vehicle which includes a propelling motor and an electric power unit for driving the motor, wherein at least a charger and an inverter are provided at the center of a vehicle body, and batteries are provided on both sides of the charger and the inverter.

BEST MODE FOR CARRYING OUT THE INVENTION

Figure 1:
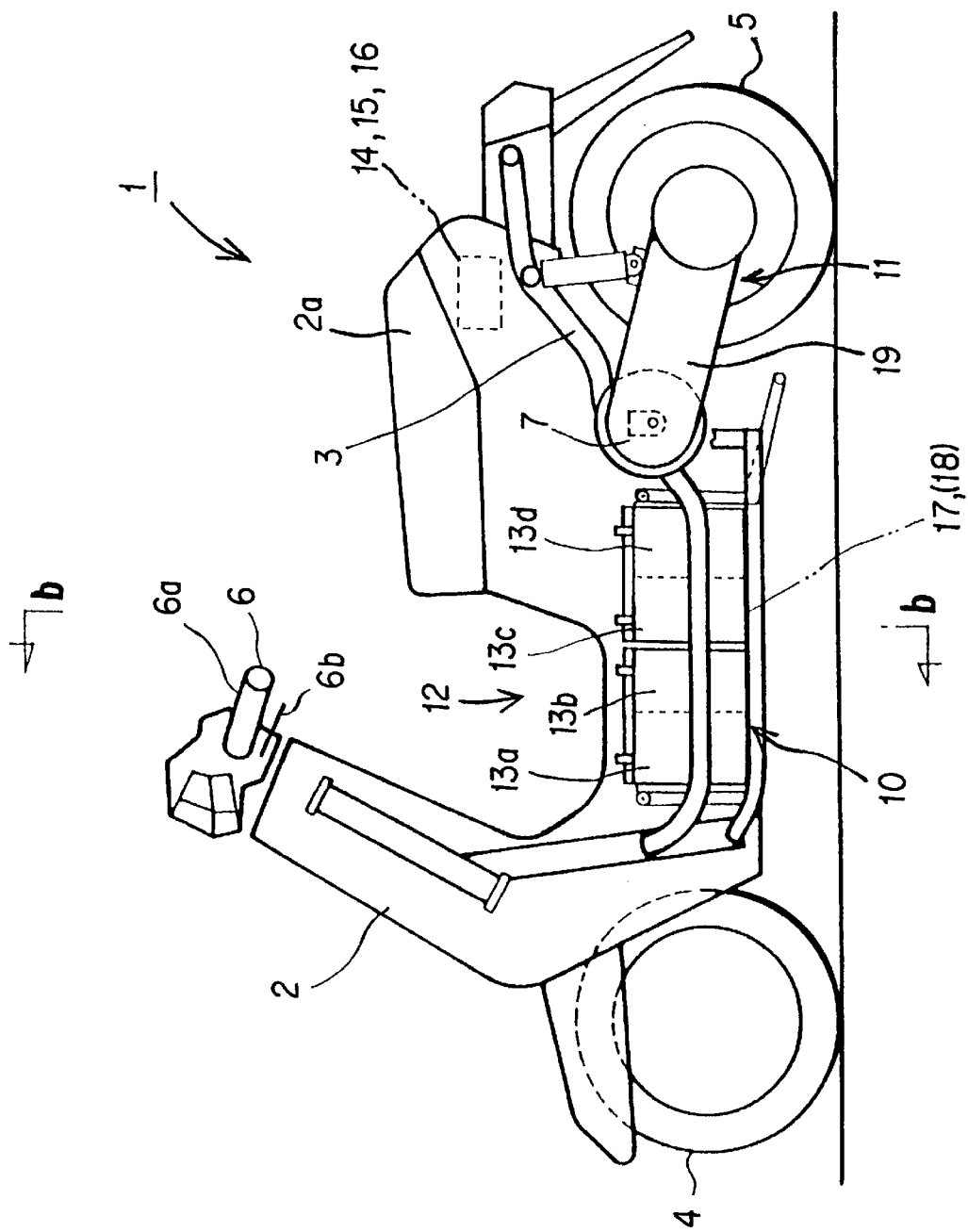
FIG. 1 is a side view schematically showing the general structure of an electric two-wheeled vehicle as an example of the electric vehicle according to the invention.
Figure 2:
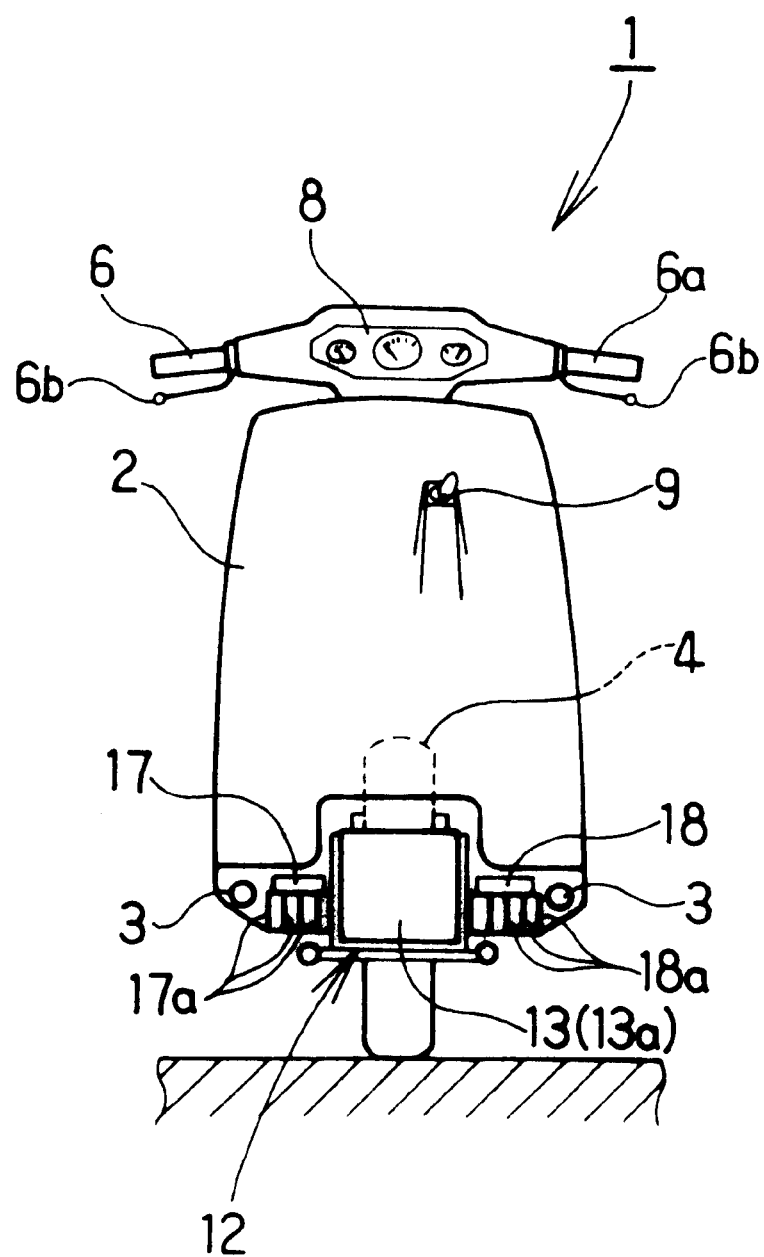
FIG. 2 is a sectional view taken along and viewed from line b—b of FIG. 1 of an electric two-wheeled vehicle as an example of the electric vehicle according to the invention.

Embodiments of the invention will be described with reference to the examples shown in FIG. 1 through FIG. 9. Each embodiment will be described with reference to an electric two-wheeled vehicle (including a scooter) as the electric vehicle as shown in FIG. 1 and FIG. 2. The basic structure of the electric two-wheeled vehicle to be described here is also used in respective illustrations to be described afterwards.

An electric two-wheeled vehicle 1 has wheels 4, 5, which are suspended from a vehicle body main frame 3, at the front and rear of a vehicle body 2, and a seat 2a, on which a driver is seated, at about the center of the vehicle body 2 in the same way as a conventional two-wheeled vehicle driven by an internal combustion engine. The front wheel 4 is steered by a handle 6, and the rear wheel 5 is driven to revolve by an electric motor 7 for running instead of an engine. And, a display panel 8 provided at the center of the handle 6 includes meters to indicate a running speed, the remaining quantity in batteries and the like, and various switches to operate mounted equipment. A main key switch 9 which turns on or off all the on-board equipment is provided on the vehicle body 2 below the display panel 8.

The main frame 3 has an electric power device 10 which supplies electric power for running to the motor and converts electric energy into mechanical motion by the electric motor 7 for running, and a power transmission device 11 which converts the motor output into appropriate torque and transmits efficiently to the rear wheel 5. Though some are omitted from being illustrated, an accelerator grip 6a and a brake lever 6b provided on the handle 6, a brake mechanism and suspensions are basically same as those used for a conventional electric two-wheeled vehicle. And, various operation switches of the accelerator grip 6a, the brake lever 6b and the main key switch 9 are electrically connected to the electric power device 10.

The electric power device 10 comprises an electric power unit 12 mounted at about the center and a lower level of the main frame 3 of the vehicle body 2; a remaining capacity meter 14, a stabilization circuit 15 and a control circuit 16 which are mounted at the rear section of the vehicle body 2; and various sensors provided on the respective on-board equipment. And, drive power is supplied to the propelling motor 7 through the interconnected operation of a group consisting of these devices and circuits. A charger 17 and a motor drive circuit 18 are provided on both sides of the electric power unit 12, respectively. Besides, a large-size heat radiation board 17a is provided on the vehicle body 2 just below the charger 17 and the motor drive circuit 18 to radiate into the atmosphere the heat generated when the respective circuits 17, 18 operate, thereby effecting appropriate heat radiation.

The electric power unit 12 includes a battery power supply unit 13 which is fixed to the frame 3. The battery power supply unit 13 has a plurality of batteries 13a, 13b, 13c, 13d and the like connected in series by a cable which prevents a transmission loss of power to obtain a predetermined output power such as 48 V for the motor. And, the power from the electric power unit 12 is stabilized by the stabilization circuit 15 and supplied to the respective on-board equipment.

And, the motor drive circuit 18 for driving the motor mainly comprises an MOS-FET circuit which is a high-speed switching device. By the chopper control according to the switching operation of the FET circuit, an effective voltage to be supplied to the propelling motor 7 is raised or lowered to control the motor output. And, the switching control is performed on the bases of a control command from the control circuit 16 corresponding to the accelerator opening.

The control circuit 16 receives signals from the sensors disposed on the accelerator grip 6a and the mounted equipment and comprises a microcomputer which outputs command and operation state signals to the motor drive circuit 18 and the display panel 8. The microcomputer includes an A/D converter which makes digital conversion of respective input signals, an I/O port, a CPU, a memory, and the like, processes in conformity with the program stored in the memory according to the accelerator opening owing to the operation of the accelerator grip 6a and detection signals from the respective sensors, and outputs an appropriate operation command such as a duty setting signal or the like to the motor drive circuit 18.

Further, the power transmission device 11 has a transmission 19 and converts the output of the propelling motor 7 into appropriate torque by the transmission 19 to transmit efficiently to the rear wheel 5.

Accordingly, when the driver turns on the main key switch 9, the electric power device 10 starts to operate, and electric power is supplied from the electric power unit 12 to the respective on-board equipment, so that the electric two-wheeled vehicle 1 can be started. Then, when the accelerator grip 6a is operated by the driver, the control circuit 16 outputs accordingly an appropriate control command to the motor drive circuit 18. According to the control command, the motor drive circuit 18 increases or decreases driving electric power supplied to the propelling motor 7 to adjust the output of the propelling motor 7. And, the motor output is converted into appropriate torque and transmitted to the rear wheel 5 by the transmission 19 as the power transmitting device, and the electric two-wheeled vehicle 1 runs forwards at a speed desired by the driver.

A safety mechanism for the electric vehicle according to the invention will be described in detail with reference to the examples shown in the drawings. As a matter of convenience in describing the invention, the respective drawings show the present invention applied to prior art.

Figure 3:
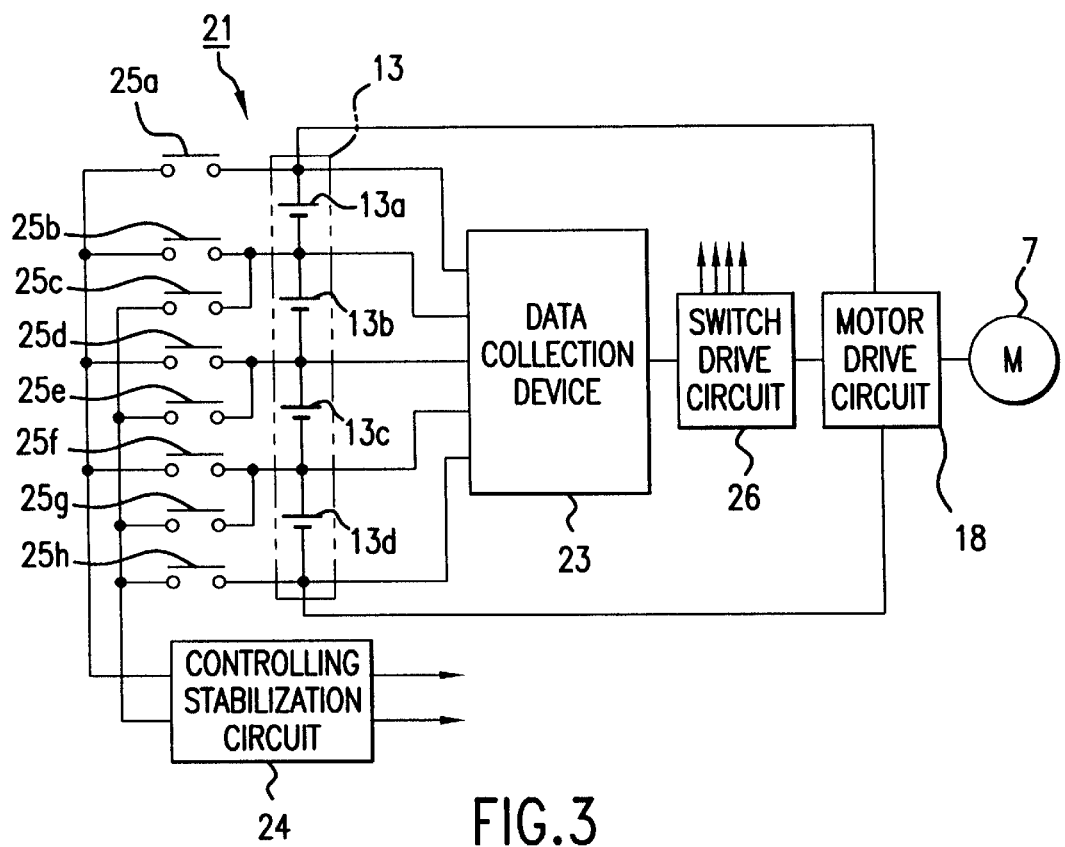
FIG. 3 is a circuit block diagram showing the general schematic structure of a safety mechanism for the electric vehicle of the invention.
Figure 4:
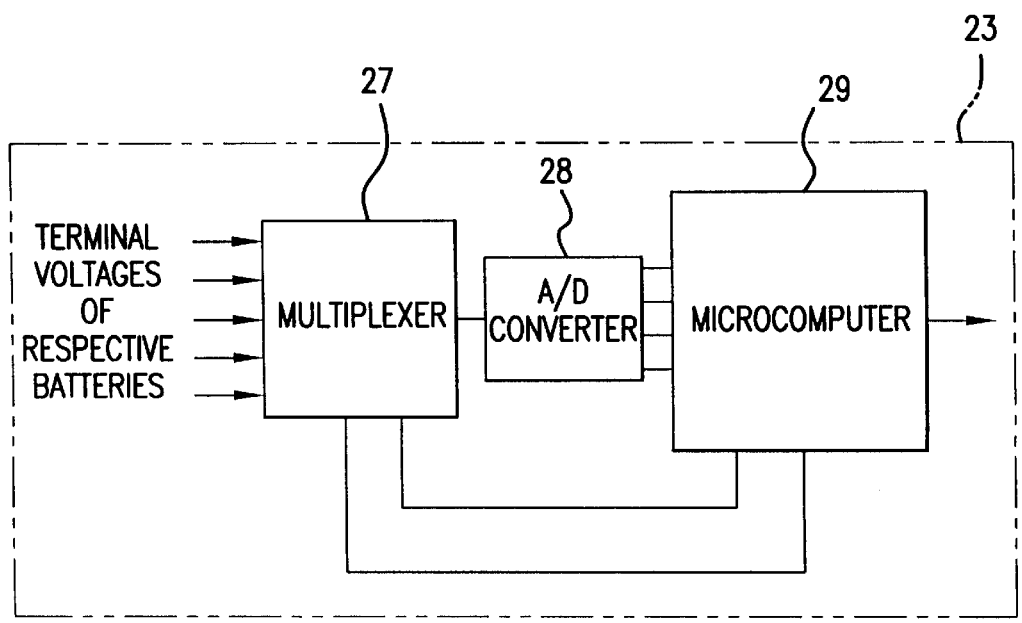
FIG. 4 is a circuit block diagram showing the data collection device of a safety mechanism for the electric vehicle of the invention.
Figure 5:
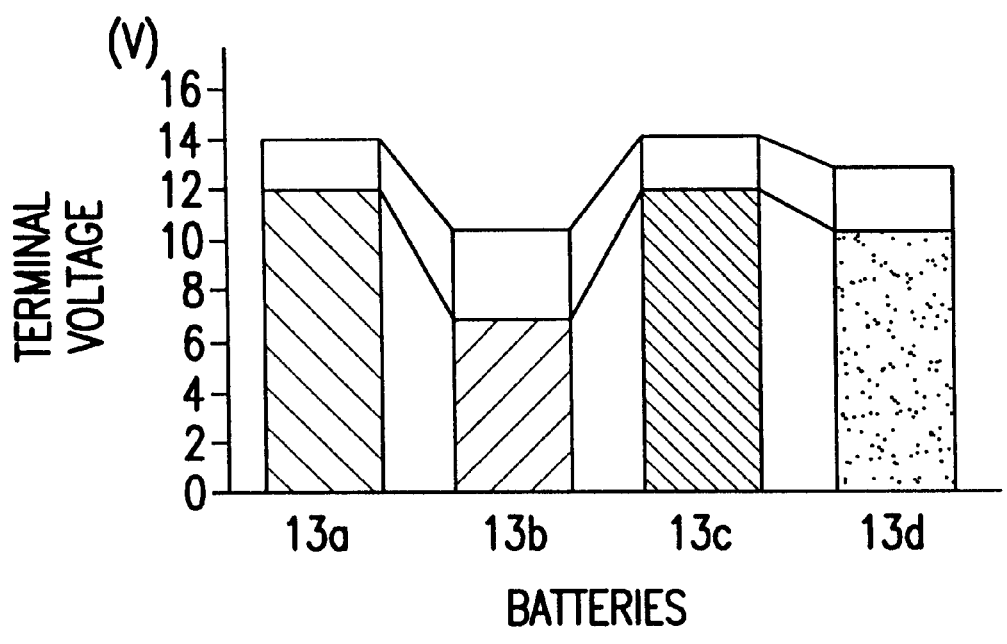
FIG. 5 is a graph showing the state of each battery of the battery power supply unit which is in discharge use in connection with a safety mechanism for the electric vehicle of the invention.

As shown in FIG. 3 through FIG. 5, the safety mechanism in this embodiment is configured so that the battery power supply unit comprising a set of coupled-batteries having a plurality of batteries connected in series and determines electrical energy quantity remained in each battery or the each group of batteries forming the set of coupled-batteries at some point during discharge, and uses a battery having a high quantity of remaining energy to supply electric power to other circuits, thereby to make a uniform discharge by the respective batteries to efficiently use the battery power supply unit as a whole.

In other words, an electric power unit 21 provided with the safety mechanism of this embodiment has a circuit as shown in FIG. 3 and comprises the battery power supply unit 13 which consists of the plurality of batteries 13a, 13b, 13c, 13d connected in series, a data collecting device 23 which is connected in parallel to connection lines of these batteries 13a through 13d and judges a maximum capacity among the terminal voltages of the respective batteries 13a through 13d, a group of selection switches 25a through 25h using transistor switching elements connected in parallel which connect any of the batteries 13a through 13d selected based on the maximum capacity in parallel to a control stabilization circuit 24, and a switch drive circuit 26 which controls to connect the group of selection switches 25a through 25h.

As shown in FIG. 4, the data collecting device 23 comprises an analog multiplexer 27 which selectively switches successively the received terminal voltages of the respective batteries 13a through 13d to output, an A/D converter 28 which converts the selected terminal voltage into a digital signal, and a microcomputer 29 which processes and judges in conformity with the built-in program according to the digital signal corresponding to the terminal voltage and outputs a prescribed control command to the switch drive circuit 26.

The analog multiplexer 27 has a plurality of input terminals connected in parallel to the output terminals of the respective batteries 13a through 13d and a single output terminal connected to the subsequent stage of A/D converter 28, so that the output voltages received from the batteries 13a through 13d can be alternately switched and output. In other words, the multiplexer 27 has a signal line for controlling the switching operation connected to the microcomputer 29, and based on a switching signal to be output by the microcomputer 29 in conformity with the built-in program, alternately switches sequentially the terminal voltages of the respective batteries 13a through 13d with time to output to the subsequent stage of A/D converter 28.

And, the A/D converter 28 converts the entered terminal voltage into a digital signal having a value corresponding to the level of the voltage and outputs it to the subsequent stage of microcomputer 29.

Besides, the microcomputer 29 stores into a memory the digitized terminal voltage values of the respective batteries 13a through 13d, processes in conformity with the built-in program, predicts the electric energy quantities remained in the respective batteries 13a through 13d, compares the remained quantities, and determines a battery having the maximum remained quantity among the batteries 13a through 13d. And, the microcomputer 29 outputs a prescribed operation command to the switch drive circuit 26 to connect the battery (one of the batteries 13a through 13d) having the maximum quantity in parallel to the control stabilization circuit 24. In other words, the selection switches 25a through 25h which are positioned between both ends of the battery having the largest capacity among the batteries 13a through 13d and the control stabilization circuit 24 are operated for connection by the switch drive circuit 26, and the selected battery is connected in parallel to the control stabilization circuit 24 to supply an electric current to the control circuit 16 or the like.

When some of the batteries have the same remained quantity, it is designed to make selection appropriately.

And, the program in the microcomputer used for predicting the remained capacities of the respective batteries can be selected from various methods of general remained quantity meters. In other words, selection is made from a method for determining in view of a drop rate of terminal voltage, a method for determining by integrating to trace power consumption obtained by multiplying a terminal voltage and a current, and a method for predicting in view of an increase rate of the internal resistance by calculating from a terminal voltage and a current, or these methods may be used in combination.

When an open voltage detection method which utilizes a change in the terminal voltage at the removal of load depending on the remained quantity is used, the voltage of each battery is detected when a load is opened, and a battery having the highest voltage is selected.

And, when discharge is continued for a long period of time, the integrating method or the internal resistance detecting method is advantageous. In such a case, with a current sensor, which is not shown in the drawings, for detecting the output electric currents from the batteries, (1) an integrated electric power value obtained by integrating the electric power output from the respective batteries in view of the battery currents and the terminal voltages of the respective batteries or (2) an internal resistance value is used to calculate the remained capacity of each battery, and a battery having the largest remained capacity is selected.

Besides, a capacitance value obtained by summing the remained capacities of the respective batteries and a remaining capacity value predicted from the voltage output of the battery power supply unit may be compared to improve the accuracy of predicting the remaining capacity value of the battery power supply unit.

Now, operation of the electric power unit 21 of the electric vehicle will be described.

As shown in FIG. 5, when the output terminal voltages and the remained capacities of the respective batteries 13a through 13d are variable at some point in the discharge use, a battery having the largest remained capacity, e.g., the battery 13c, is selected by the data collection device 23.

In FIG. 3, then, the selection switches 25d, 25g positioned at the plus and minus of the selected battery 13c are turned on to connect the battery 13c in parallel to the control stabilization circuit 24, and electric power of 12 V is directly supplied from the battery 13c to the control circuit 16. And, this state is continued when the battery has a capacity higher than those of the other batteries, and when its capacity becomes lower than those of the other batteries, switching is made to another battery. Therefore, a battery having a higher remained quantity is also used as the power source for the control circuit, the respective batteries are checked for the capacity at prescribed time intervals to switch the battery to be used in combination, so that the remaining capacities of the respective batteries can be prevented from being made nonuniform, and the respective batteries can be used to discharge uniformly.

The time intervals for checking the capacities of the respective batteries may be determined as desired, and can be determined to be relatively long to, e.g., five minutes, to prevent a frequent switch to the control battery for combined use. And, the check interval may be made short and the switching interval may be made long, and they may be combined as desired. In addition, in the example shown in the drawing, the states of the remaining capacities of the respective batteries were judged, but in addition to the respective batteries, the remaining capacity may be judged with reference to a group of some batteries, namely the discriminated multiple batteries.

And, to detect the terminal voltage at the removal of load, the capacity check is performed when the loads of the motor and auxiliary devices (head lamp, turn signals, horn, airconditioner, radio, etc.) are removed. For example, the accelerator signal is interconnected with the auxiliary device switch, and the terminal voltages of the respective batteries are detected every time both of them are turned OFF, and detection and switching operations are performed every time the electric vehicle is stopped.

In the integrating method or the internal resistance detecting method, when an interval of integrating an electric current or power is 0.5 second, selection of respective multiple batteries is performed in a cycle of 0.5 second, and connection may be performed at appropriate time intervals.

As described above, with the safety mechanism for the electric vehicle in this embodiment, the remaining capacity of each of "the discrete batteries forming the set of coupled-batteries" or each of "the group of batteries forming the set of coupled-batteries" is determined to use a battery having a larger capacity to supply electric power to other circuits, so that non-uniformity of the remaining capacities of the respective batteries can be decreased and batteries can be used uniformly, enabling the battery power supply unit as the whole to used the total power energy of the respective batteries efficiently. In other words, over-discharge of a particular battery can be prevented, and the capacity available for a single charging can be increased. And, since the discharged states of the respective batteries can be made uniform, the charged state can be made uniform at the completion of charging. Besides, a charging or discharging load can be prevented from being applied exclusively to a particular battery, so that the number of repeated discharging/recharging times of the battery can be increased. As a result, since the safety performance as the electric power unit can be improved, the trafficable distance of the electric vehicle can be increased, and the total safety performance can be improved.

This embodiment has been described with the safety mechanism applied to the electric vehicle, but not limited to it, and can be applied extensively to electric equipment, which uses the combined battery as the battery power supply unit, such as portable equipment and motor-driven toys which are transportable.

Another embodiment of the invention will be described with reference to examples shown in FIG. 6 and FIG. 7.

The safety mechanism in this embodiment judges an output voltage state of the battery power supply unit, and when it drops to below a predetermined voltage value, a separately provided auxiliary battery is connected in series to the power supply line of the battery power supply unit to restore the output voltage state of the battery power supply unit to the normal level, thereby enables to use efficiently the batteries as the whole.

Figure 6:
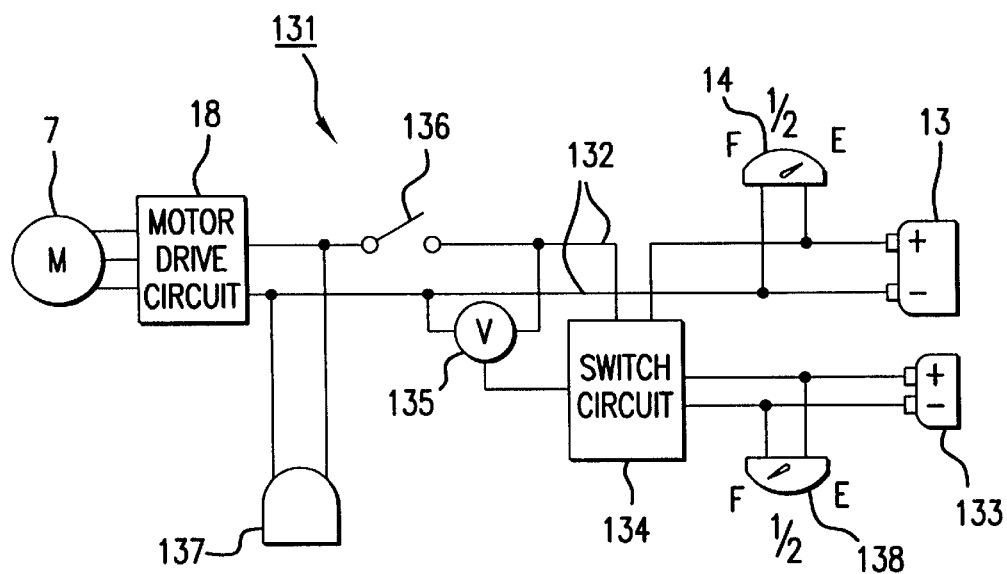
FIG. 6 is a circuit block diagram showing the general schematic structure of a safety mechanism for the electric vehicle of the invention.

Specifically, an electric power unit 131 in this embodiment comprises a voltage supplement circuit which connects an auxiliary battery 133 in series to a power supply line 132 connected from the battery power supply unit 13 to the motor 7 through the motor drive circuit 18 as shown in FIG. 6. This electric power unit 131 comprises the battery power supply unit 13 consisting of a plurality of batteries, the auxiliary battery 133 which is connected to the power supply line 132 from the battery power supply unit 13 through a switch circuit 134 and connected in series to the power supply line 132, and a voltmeter 135 which is connected in parallel to the power supply line 132 at a point closer to the motor than to the switch circuit 134 and outputs a command of making connection to the switch circuit 134 when the output voltage of the battery power supply unit 13 is lower than a predetermined value. And, an input changeover switch 136 which interrupts the current supply from the battery power supply unit 13 and the auxiliary battery 133 and an external connection plug 137 which is connected to an external power source are provided on the power supply lines 132 at a point closer to the motor than to the voltmeter 135. Besides, dedicated remaining capacity meters 14, 138 are provided for the battery power supply unit 13 and the auxiliary battery 133.

The auxiliary battery 133 has charging characteristics which are at least the same to those of the battery power supply unit 13 and its capacity is smaller than the battery power supply unit 13. And, the auxiliary battery 133 is not limited to have the output voltage equivalent to a voltage value for supplementing a voltage drop of the battery power supply unit 13 in use, but one having a lower output voltage may be connected via a voltage booster circuit.

The voltmeter 135 is connected in parallel to the power supply line 132 and set to output a connection signal to the switch circuit 134 when the output voltage supplied from the battery power supply unit 13 to the power supply line 132 lowers to a predetermined voltage value.

The switch circuit 134 is a transistor switch element, and the input terminal to make the element operate for connection is connected to the output terminal of the voltmeter 135. And, when the switch circuit 134 is in its initial state, electricity is supplied from the battery power supply unit 13 to the motor drive circuit 18 via the power supply line 132, and the auxiliary battery 133 is kept not connected to the power supply line 132. And, in conformity with the connection signal from the voltmeter 135, the auxiliary battery 133 is connected in series to the power supply line 132.

Therefore, when the voltage output of the battery power supply unit 13 drops to a predetermined value owing to the running of the vehicle, it is detected by the voltmeter 135, and a connection signal is outputted to the switch circuit 134. Then, by the connection operation of the switch circuit 134, the auxiliary battery 133 is connected in series to the power supply line 132 from the battery power supply unit 13, and the drop of the output voltage from the battery power supply unit 13 is supplemented by the voltage from the auxiliary battery 133.

Figure 7:
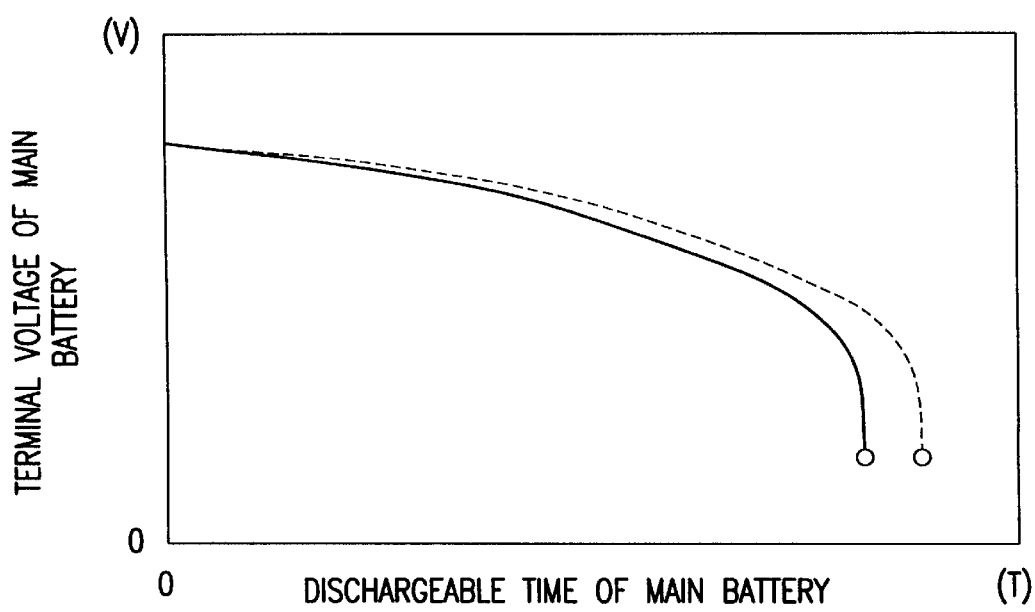
FIG. 7 is a graph illustrating the discharge output operation by the battery power supply unit in connection with a safety mechanism for the electric vehicle of the invention.

But, the discharge characteristic of the battery power supply unit 13 is generally indicated as a discharge curve shown in a solid line in FIG. 7, but when the configuration is made as in this embodiment, the auxiliary battery 133 is connected in series to the battery power supply unit 13 to additionally supplement when the output voltage of the battery power supply unit 13 drops to a predetermined voltage value. Therefore, the discharge characteristic as the whole shows a discharge curve as indicated in a broken line, the output as the battery power supply unit can be retained, and the batteries as the whole can be used efficiently.

The output of the auxiliary battery 133 may be made variable to supplement the voltage drop at the final stage of the discharge of the battery power supply unit 13 and to keep constant the output voltage as the electric power unit. In other words, it may be configured that a voltage booster circuit for the auxiliary battery 133 is disposed between the power supply line 132 and the auxiliary battery 133, and the voltage booster circuit is controlled in accordance with the voltage of the battery power supply unit 13.

And, the remaining capacity meters exclusively provided for the battery power supply unit 13 and the auxiliary battery 133 are set to have a display scale to correspond to the capacities thereof. In other words, it is known that since the battery power supply unit 13 has a relatively large capacity, accuracy of the remaining capacity meter can not be expected to be higher than a certain level. On the other hand, in comparison with the battery power supply unit 13, the auxiliary battery 133 has a small capacity and the absolute remaining capacity of the auxiliary battery can be specified strictly, so that the remaining capacity in a very fine scale size of the auxiliary battery 133 can be known with high accuracy. Therefore, when the battery power supply unit 13 and the auxiliary battery 133 are, for example, 1:10 in capacity, the scales of their remaining capacities are set as 1:1/10. Thus, since the finally remaining capacity of the batteries as the whole including the auxiliary battery 133 can be predicted in a fine scale, the prediction accuracy of the remaining capacities as the whole can be improved.

In addition, since an input changeover switch 136 and the external connection plug 137 are provided on the power supply line 132, it is easy to comply with even when the battery power supply unit 13 and the auxiliary battery 133 are consumed or the batteries cannot be discharged due to some reason. In other words, by turning off the input changeover switch 136, the power supply line 132 from the battery power supply unit 13 and the auxiliary battery 133 is electrically interrupted, the external connection plug 137 is connected to the external power source provided with a connection terminal corresponding to the plug 137, so that the vehicle can be run to a place where recharging can be made. And, the external power source may be a reserve battery or a battery which is generally mounted on another vehicle, and in the latter case, both vehicles can be run together.

And, in addition to the above-described configuration that namely when the voltage output of the battery power supply unit 13 drops to a predetermined value, the voltmeter 135 detects it and outputs the connection signal to the switch circuit 134, and the auxiliary battery 133 is connected to the power supply line 132 from the battery power supply unit 13, thus a simpler configuration can be provided without using a voltmeter. In this case, the voltage output of the battery power supply unit 13 is recognized from the battery's remaining capacity value which is indicated on, e.g., the display panel 8, and the switch circuit 134 is operated manually to connect the auxiliary battery 133 in series to the power supply line 132. By configuring in this way, the drop of the output voltage from the battery power supply unit 13 is supplemented with the voltage from the auxiliary battery 133 in the same way as in the previous embodiment, and switching to the auxiliary battery can be made as desired earlier than in the case of using the voltmeter 135. As a result, switching can be made prior to a sharp drop of the power from the battery power supply unit, so that the battery power as the whole can be preserved. In the manual switching method, the auxiliary battery may have the same capacity as the battery power supply unit, and they can be provided in parallel to each other.

As described above, with the safety mechanism in this embodiment, by connecting the auxiliary battery in series or by providing it in parallel and switching, the drop of the voltage output from the battery power supply unit can be decreased, the voltage drop at the discharge end of the battery power supply unit can be supplemented to keep the output constant, the batteries as the whole can be used efficiently, the output as the power supply unit can be made constant, and the vehicle's running performance and safety performance can be improved.

And, when the auxiliary battery is being used, the finally remaining capacity can be presumed from the remaining capacity meter of the auxiliary battery which has a smaller capacity than the battery power supply unit and a finer indication scale, estimation accuracy for the remaining capacity is improved, and the driver can accurately know a remaining trafficable distance or the like.

Besides, when the battery power supply unit and the auxiliary battery have been consumed, the connection of the power supply line can be cut by the changeover switch and an external power source can be connected by the external connection plug, so that the vehicle can run by itself. For example, by using the same type of vehicle having a sufficient battery capacity as the external power source, accompanied running can be made with ease. And, the reserve battery which has been provided on the exterior of the vehicle can be connected by the external connection plug. Thus, flexible countermeasures can be taken.

Furthermore, in the case of starting in a low-temperature environment, when the discharge output performance of the battery power supply unit is lowered due to a low temperature, this voltage drop can be supplement by the safety mechanism of the invention, and the vehicle's running performance can be retained. In other words, the output voltage drop can be prevented until the battery power supply unit is heated to return to its normal output state by the operation heat from the respective equipment after the vehicle is started at a low temperature.

In case of blackout, the electric power unit of this safety mechanism can also be used as a blackout compensation device which can supply a constant voltage to a given device without fail.

Figure 8:
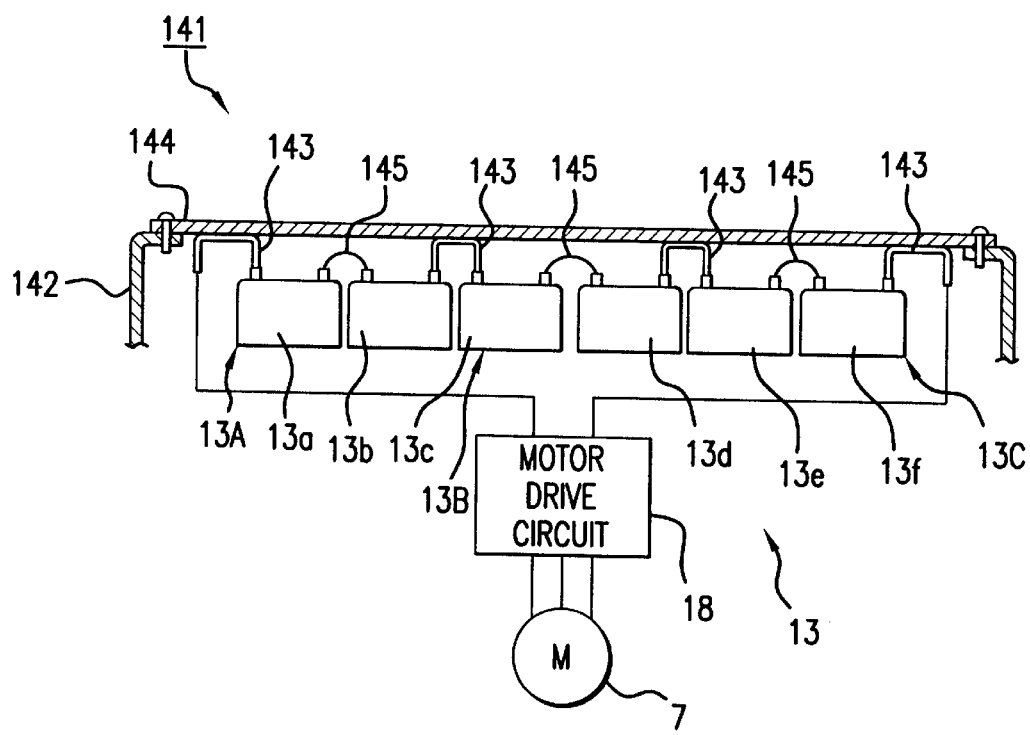
FIG. 8 is a schematic vertical sectional view showing the general structure in connection with a safety mechanism for the electric vehicle of the invention.

Another embodiment of the invention will be described with reference to examples shown in FIG. 8 and FIG. 9.

The safety mechanism in this embodiment provides the combined battery as the battery power supply unit by blocking batteries which are connected to a voltage at a level not harmful to human body, and connecting these batteries without a cable by fitting a cover having a conductor, thereby preventing an electric shock without fail and securing complete safety.

Specifically, an electric power unit 141 in this embodiment comprises blocked batteries 13A through 13C formed by previously connecting a plurality of batteries to have a voltage not harmful to human body, such as a DC voltage of 24 V, an on-board case 142 containing the blocked batteries 13A through 13C fixed in a prescribed state, and a case cover 144 having conductors 143 which are provided to correspond to the respective terminal positions of the blocked batteries 13A through 13C. And, by placing the blocked batteries 13A through 13C in the on-board case 142 and setting the case cover 144, the blocked batteries 13A through 13C are connected in series to one another via the conductors 143 to configure a battery power supply unit 13, and terminals of the battery power supply unit 13 are connected to a propelling motor 7 via a motor drive circuit 18 on the side of the vehicle body.

The blocked batteries 13A through 13C are formed of a set of batteries 13a, 13b, . . . which are previously connected by cables 145 to provide a voltage not adversely affecting on human body.

The on-board case 142 has an opening at the top and an inner space in the form of a rectangular solid corresponding to the shapes of batteries 13a through 13f to be mounted, thereby housing to fix the batteries 13a through 13f in place.

And, the cover 144 is formed of an electrically insulating material in a flat shape having an area to close the top opening of the on-board case 142. The cover 144 has the bottom face, which is opposed to the blocked batteries 13A through 13C, provided with the conductors 143 corresponding to the respective connection terminals of the motor drive circuit 18 and the blocked batteries 13A through 13C housed in the case 142. The conductors 143 are made of copper into a long plate having some thickness to decrease a power loss during the flow of electricity. Therefore, when the cover 144 is fitted in place, the blocked batteries 13A through 13C housed in the case 142 are mutually connected without a cable, and when the cover 144 is removed, the mutual connection of the batteries is released.

Therefore, by configuring as described above, when the blocked batteries 13A through 13C are housed in the case 142 and the cover 144 is fixed in place, the blocked batteries 13A through 13C are connected in series to one another by the conductors 143 to make the battery power supply unit 13, and at the same time, both ends of the battery power supply unit 13 are connected to the terminals which are connected to the motor drive circuit 18, so that a relatively high voltage such as 72 V can be supplied from the battery power supply unit 13 to the motor 7 via the motor drive circuit 18.

Figure 9:
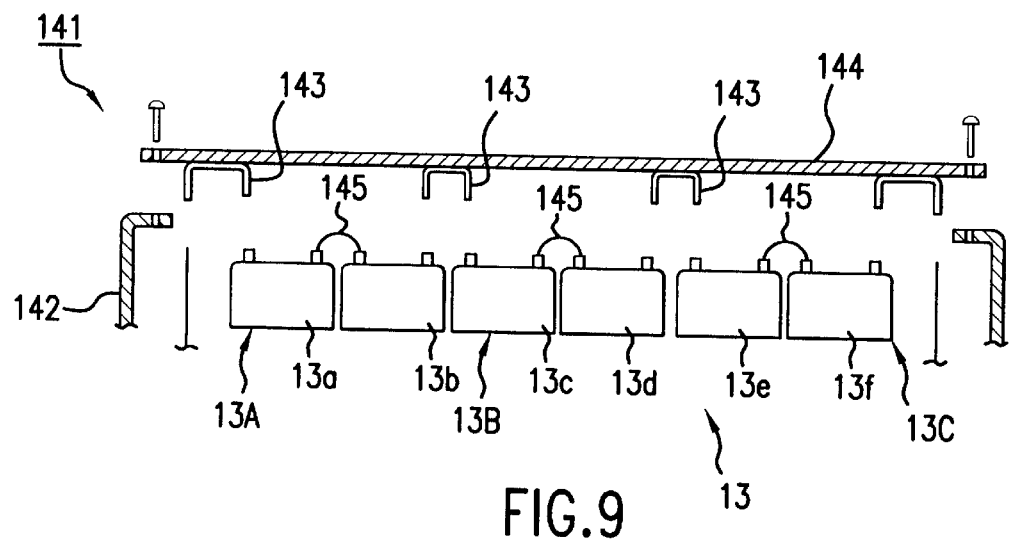
FIG. 9 is a schematic vertical sectional view showing the battery power supply unit with its cover removed for inspection or replacement work in connection with a safety mechanism for the electric vehicle of the invention.

And, as shown in FIG. 9, when the cover 144 is removed for working to check the states of respective batteries or to change the batteries, the connection of the blocked batteries 13A through 13C is released, and since the voltage of each of the blocked batteries 13A through 13C has been set to a level not adversely affecting on human body, an electric shock can be prevented with reliability.

As described above, with the safety mechanism in this embodiment, since the blocked batteries having a plurality of batteries connected are connected by the conductors provided on the cover, an electric shock can be prevented securely in working to check the states of respective batteries or to change the batteries. And, to change the consumed battery power supply unit, it is sufficient by removing the cover, attachment and removal of the connection cables involved in the mounting or removal of each blocked battery is not needed, thus the replacing work can be simplified.

It is to be noted that the above-described embodiments do not eliminate one another but may be combined as desired to be applied to a single electric vehicle. Thus, the performance as the safety mechanism is enhanced, and the overall performance of the electric vehicle can be improved.

Still another embodiment of the invention will be described with reference to examples shown in FIG. 10 through FIG. 20.

Figure 10:
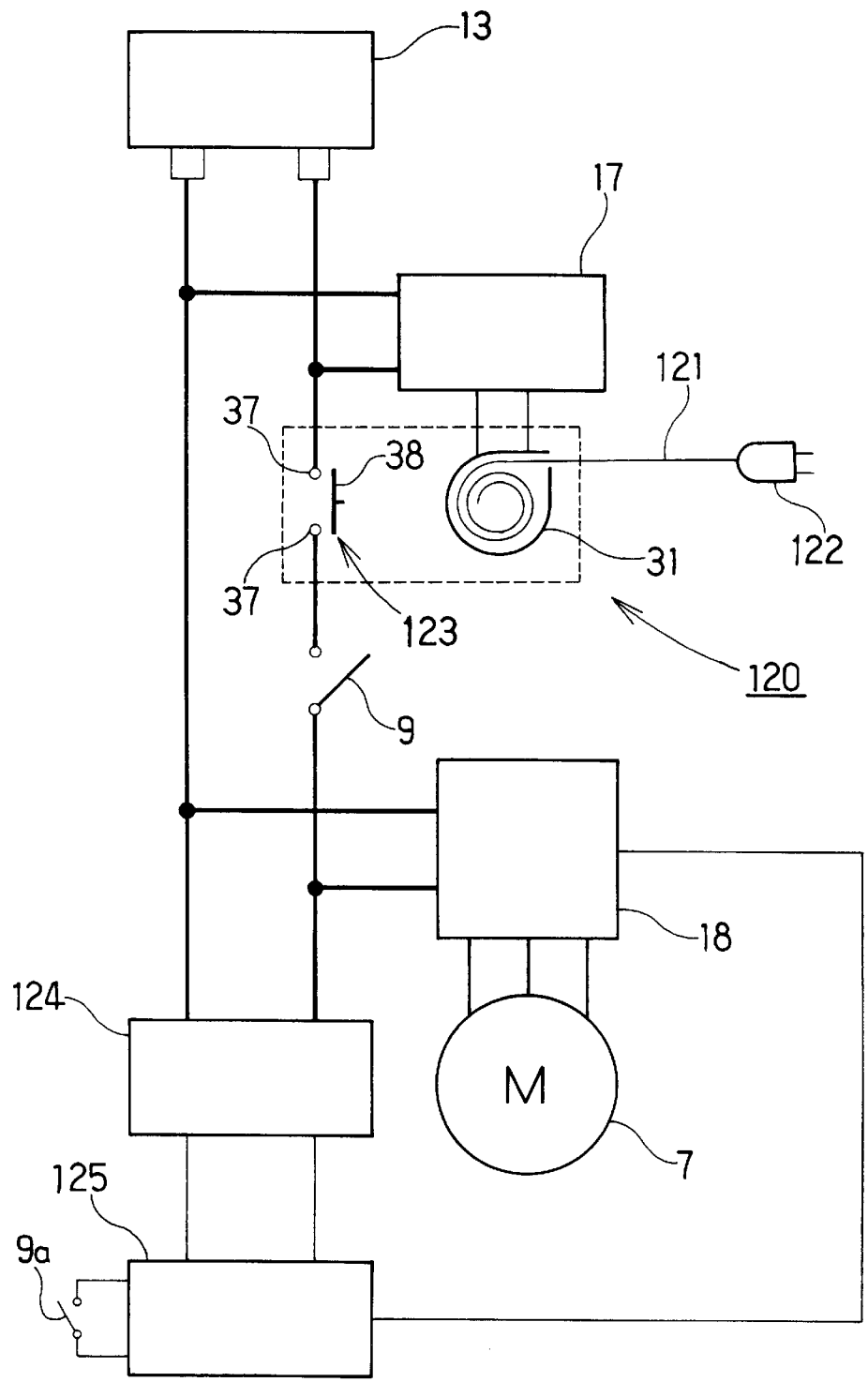
FIG. 10 is a circuit block diagram showing the general schematic structure in connection with a running-prohibiting unit for the electric vehicle of the invention.

As described above, the electric vehicle runs with the motor driven by the power supplied from the battery power supply unit, and when the remaining capacity in the batteries is lowered, recharging is made by a charger from an external power source. To recharge the batteries, the main key switch 9 is turned off, and a plug 122 of a charging cord 121 attached to the charger 17 is connected to a wall outlet as shown in FIG. 10. Then, power converted into a predetermined DC charging voltage by the charger 17 is supplied to the battery 13.

A running-prohibiting unit of the electric vehicle according to the invention is configured in that the cord reel which winds the charging cord to house in the case is supported on a spiral-grooved shaft to reciprocally move in the axial direction with the revolution by expanding or housing the cord, and a contact switch is provided to be turned off with the movement of the reel from its initial position, and the contact switch is electrically connected in series to the power supply line from the battery to the motor at a point closer to the motor than to the charging path. Therefore, when the charging cord is pulled out, the reel is revolved as the cord is pulled and moved from the initial position to turn off the contact switch, the power supply line from the battery is cut off to stop supplying the drive current from the battery to the various circuits including the motor, and the vehicle is prevented from running. On the other hand, when the cord is housed, the reel is revolved in the reverse direction to be returned to the initial position as the cord is housed, the contact switch is turned on to connect the power supply line from the battery, the drive current is supplied from the battery to the various circuits containing the motor, and the vehicle can run.

Specifically, as shown in FIG. 10, a running-prohibiting unit 120 in the first embodiment comprises that a contact switch 123 interconnected to the pulled-out/housed states of the charging cord 121 is added to an electric power system in which electric power is supplied from the battery 13 to the various circuits and the motor 7 or a charging current flows from the charger 17 connected to the external power source to the battery 13 via a charging cord 121. This electric power system has a circuit which mainly comprises the power supply line connected from the battery 13 to the motor 7 via the motor drive circuit 18, to which the charger 17 for converting the external power source such as a household or commercial power source into a voltage for charging the battery 13 and the main switch 9 connected in series at a point closer to the motor than to the charger 17 are connected. And, the running-prohibiting unit 120 comprises the contact switch 123 connected in series between the charger 17 on the power supply line of the electric power system and the main switch 9.

And, the contact switch 123 is provided in the cord case 31 which winds to house the charging cord 121 therein as described afterwards, and when the charging cord 121 is pulled out of the cord case 31, the contact switch 123 is turned off.

Accordingly, when the charging cord 121 is pulled out and the contact switch 123 is turned off, the drive current is not supplied from the battery 13 to the various circuits including the motor drive circuit 18 connected at the subsequent stage of the contact switch 123, and in this state, the electric two-wheeled vehicle 1 is prevented from running even when the main switch 9 is turned on.

Reference numeral 124 denotes a DC/DC converter which is connected in parallel to the power supply line. The DC/DC converter 124 converts the battery voltage into a voltage to be supplied to the various circuits. In other words, the DC/DC converter 124 is connected to a motor control circuit 125 and converts the battery power for the motor into a voltage for the motor control circuit. And, the motor control circuit 125 is connected to a propelling control circuit (not shown) into which an accelerator signal or the like is entered, and according to the propelling instruction signal from the propelling control circuit, a motor control signal in the propelling/regeneration mode is sent to the motor drive circuit.

Figure 11:
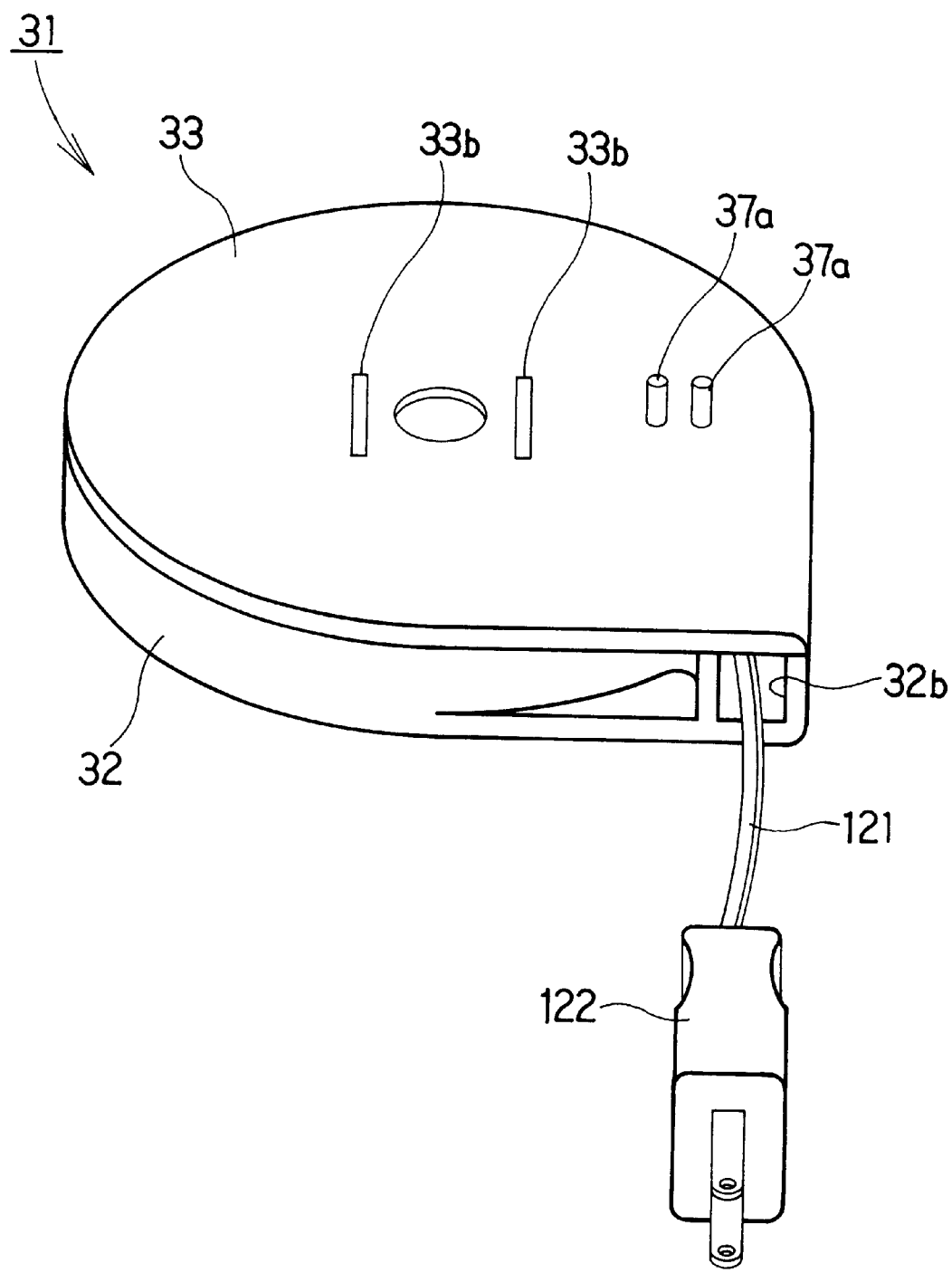
FIG. 11 is a perspective view schematically showing the cord case for housing a charging cord in connection with the running-prohibiting unit of the invention.
Figure 12:
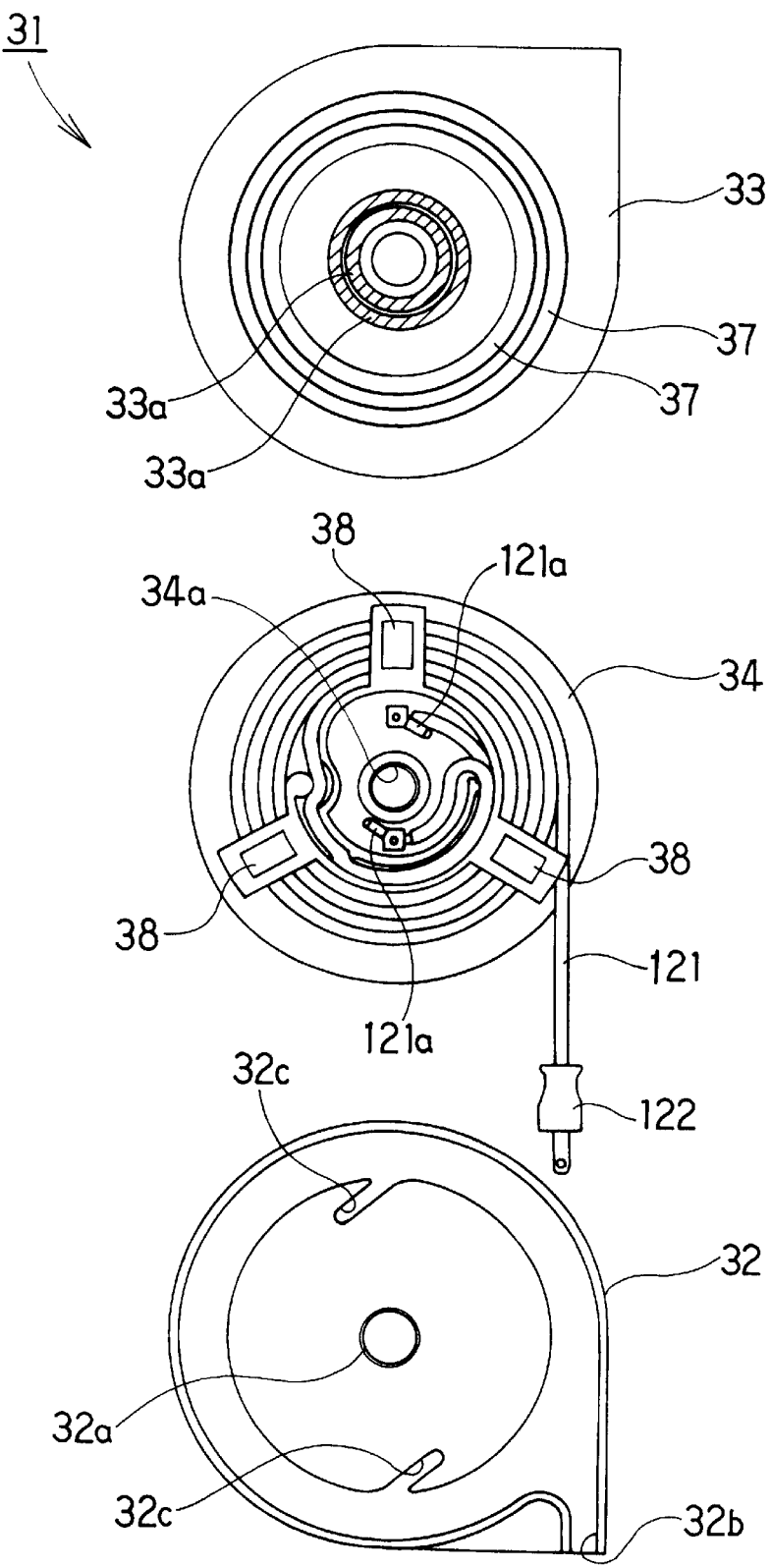
FIG. 12 is an exploded diagram of the cord case in connection with the running-prohibiting unit of the invention.
Figure 13:
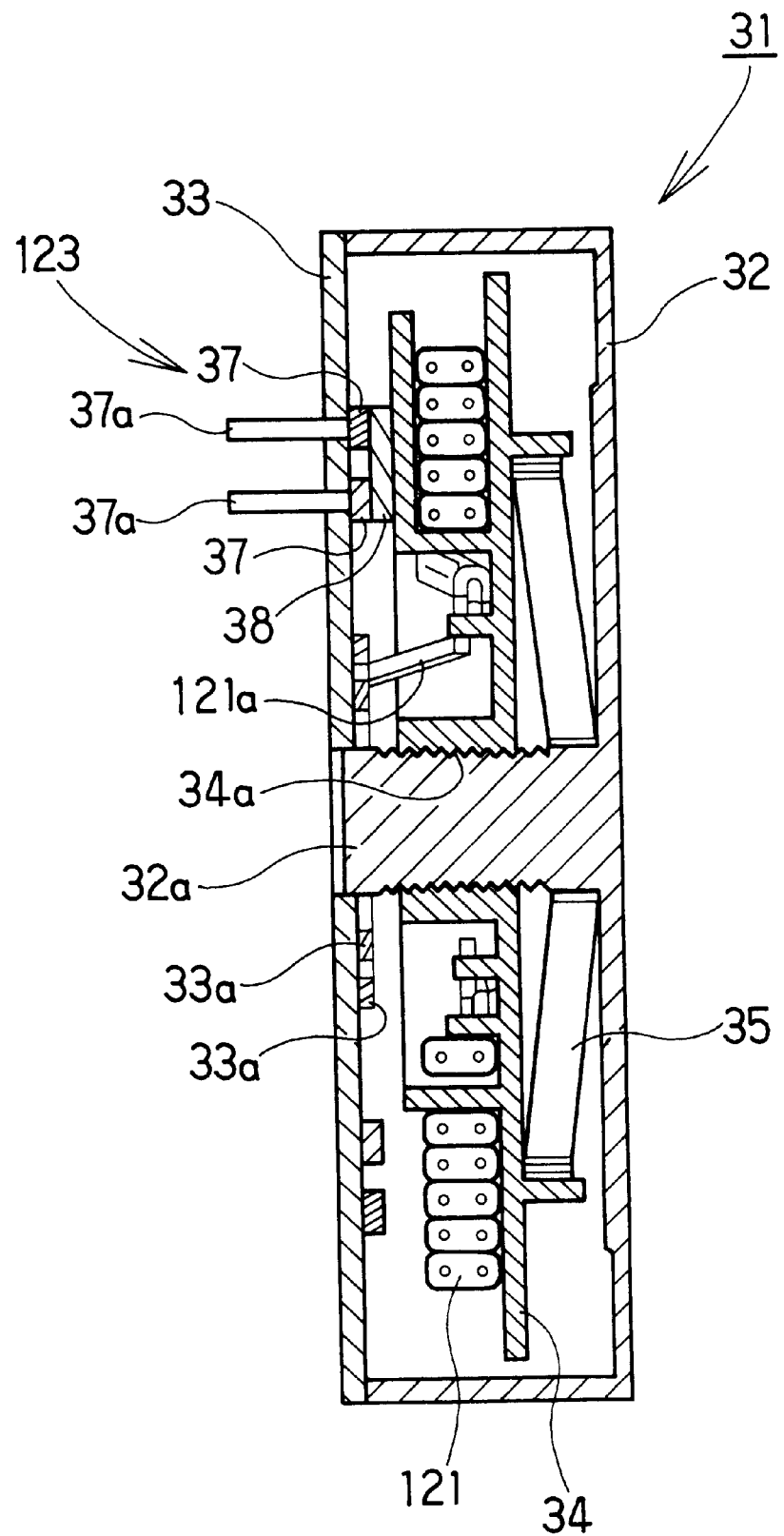
FIG. 13 is a vertical sectional view showing the cord case with a charging cord housed therein in connection with the running-prohibiting unit of the invention.

Specifically, as shown in FIG. 11 through FIG. 13, a cord case 31 in which the contact switch 123 is provided comprises a case body 32 and a cover case 33, and a cord reel 34 having a charging cord 121 wound within the cord case 31 is rotatably supported by a shaft and housed. And, a housing mechanism which automatically winds the pulled-out charging cord 121 on the cord reel 34 for housing and a lock mechanism which holds the charging cord 121 in a pulled-out state.

At the center of the case body 32, a center shaft 32a is integrally formed, and the cord reel 34 having a substantially disk shape is rotatably supported by the center shaft 32a. And, the case body 32 is formed in the form of a disk and a side wall formed on its outer periphery. The side wall has an opening 32b for the passage of the charging cord 121. Besides, the cord reel 34 has the charging cord 121 wound on it to house the charging cord 121 within the cord case 31 in a compact form.

Specifically, the charging cord 121 is a double conductor cord having a predetermined length with its base ends fixed to the cord reel 34 and its leading end provided with a plug 122 having a predetermined shape to be inserted into a home wall outlet. And, rotating contact pieces 121a, 121a made of a conducting material are protruded toward the cover case 33 at the base ends of the charging cord 121. And, to correspond to the rotating contact pieces 121a, 121a, the cover case 33 is provided with two stationary contacts 33a, 33a which are made of a conductive material and formed into the form of a ring having a different diameter. And, the rotating contact piece 121a of each charging cord 121 is provided to make sliding contact with the corresponding stationary contact pieces 33a of the cover case regardless of the revolving state of the cord reel 34. And, the respective stationary contact pieces 33a, 33a are contacted to contact terminals 33b, 33b (see FIG. 11) protruded out of the cover case 33, and the respective terminals 33b, 33b are connected to the charger 17. Therefore, the charging cord 121 is provided to be kept electrically connected to the external contact terminals 33b, 33b of the cord case 31, regardless of its housed or pulled-out state.

And, the housing mechanism which automatically houses the charging cord 121 uses a coil spring 35 to turn the cord reel 34 in the retracting direction when the charging cord 121 is pulled out. This coil spring 35 is formed of a leaf spring which is made of an elastically deformable material and shaped in a spiral with intervals, its one end at the inner periphery is fixed to the case body 32, and the end at the outer periphery is fixed to the cord reel 34. Therefore, when the charging cord 121 is pulled out of the cord case 31 in order to recharge, the cord reel 34 on which the charging cord 121 is wound turns in one direction, the coil spring 35 is elastically deformed and wound, and the coil spring 35 accumulates energy to rotatably push the cord reel 34 in a storing direction. And, when the charging cord 121 is pulled out as required, the charging cord 121 is wound back to the cord reel 34 by the coil spring 35.

And, the lock mechanism to hold the charging cord 121 in the pulled-out state comprises an engaging notch 32c which is slantingly formed from the center toward the outside of the case body 32 and a claw (not shown) formed on the cord reel 34 to correspond to the engaging notch 32c. The claw of the cord reel 34 is formed into a substantially strip shape and disposed with its base end supported by a shaft on the outer periphery with respect to the engaging notch 32c so as to be oscillated in a radial direction and energized to a predetermined extent by a spring or the like so that the leading end is directed inside. Therefore, when the pulled-out charging cord 121 is relatively slowly retracted, the claw of the cord reel 34 catches the engaging notch 32c of the case body 32, and the charging cord 121 is locked in the pulled-out state. And, when the charging cord 121 in this state is further pulled out to release the engagement of the engaging notch 32c of the case body 32 with the claw of the cord reel 34 and suddenly freed, it is automatically rewound by the coil spring 35 into the case. In other words, during this rewinding, the leading end of the claw is opened in the outward direction, so that the claw does not engage with the engaging notch 32c.

And, a mechanism configuring the contact switch 123, which is contacted when the cord is housed as predetermined, provides the cord reel 34 to be movable in the axial direction by the revolving operation of the cord reel 34 for the charging cord 121 to be pulled out or stored and to close or open the contact switch 123 accordingly.

Specifically, a right-turn male thread is formed on the outer periphery of the center shaft 32a which is provided at the center of the case body 32. And, a right-turn female thread is similarly formed on a center shaft hole 34a of the cord reel 34 to correspond to the center shaft 32a of the case body 32. Therefore, it is designed that when the charging cord 121 is pulled out, the cord reel 34, on which the charging cord 121 is wound, is rotated in the forward direction to move from the initial position. And, to store the charging cord 121 from the pulled-out state, the cord reel 34 is rotated in the reverse direction to wind the charging cord 121 on the cord reel 34 for storage, and this reverse rotation returns the cord reel 34 to its initial position.

And, the contact switch 123 comprises stationary contacts 37 provided on the side of the cover case 33 and a movable contact 38 provided on the side of the cord reel 34, and when the charging cord 121 is stored and the cord reel 34 is returned to the initial position, the movable contact 38 comes in contact with the stationary contacts 37, and the contact switch 123 comes in a contacted state. On the other hand, when the cord is pulled out, the cord reel 34 moves from the initial position, and the movable contact 38 separates from the stationary contact 37, and the contact switch 123 becomes in a non-contact state.

The stationary contact 37 comprises two stationary contacts 37, 37 formed of a conductive material into rings having a different diameter and are mutually separated in the radial direction at a predetermined interval. And, the respective stationary contacts 37, 37 are connected to externally protruded connection terminals 37a, 37a out of the cover case 33, and these terminals 37a, 37a are connected in series to the power supply line.

And, the movable contact 38 is similarly formed of a conductive material into the form of a strip and consists of three contacts which are provided at a distance in the radial direction corresponding to the stationary contacts 37, 37 and at equal intervals on the periphery of the cord reel 34, and they are formed to come in contact with the annular stationary contacts 37, 37 when the cord reel 34 is at the initial position.

Accordingly, when the movable contact 38 comes in contact with the stationary contact 37, namely when the charging cord 121 is stored into the cord case 31, the contact switch 123 is conducted. Then, when the main key switch 9 is turned on, the power supply line becomes in a contacted state, and the drive current is supplied from the battery 13 to the motor/circuit group to make the vehicle runnable.

Now, description will be made of the operation of the running-prohibiting unit 120 of the electric vehicle.

Figure 14:
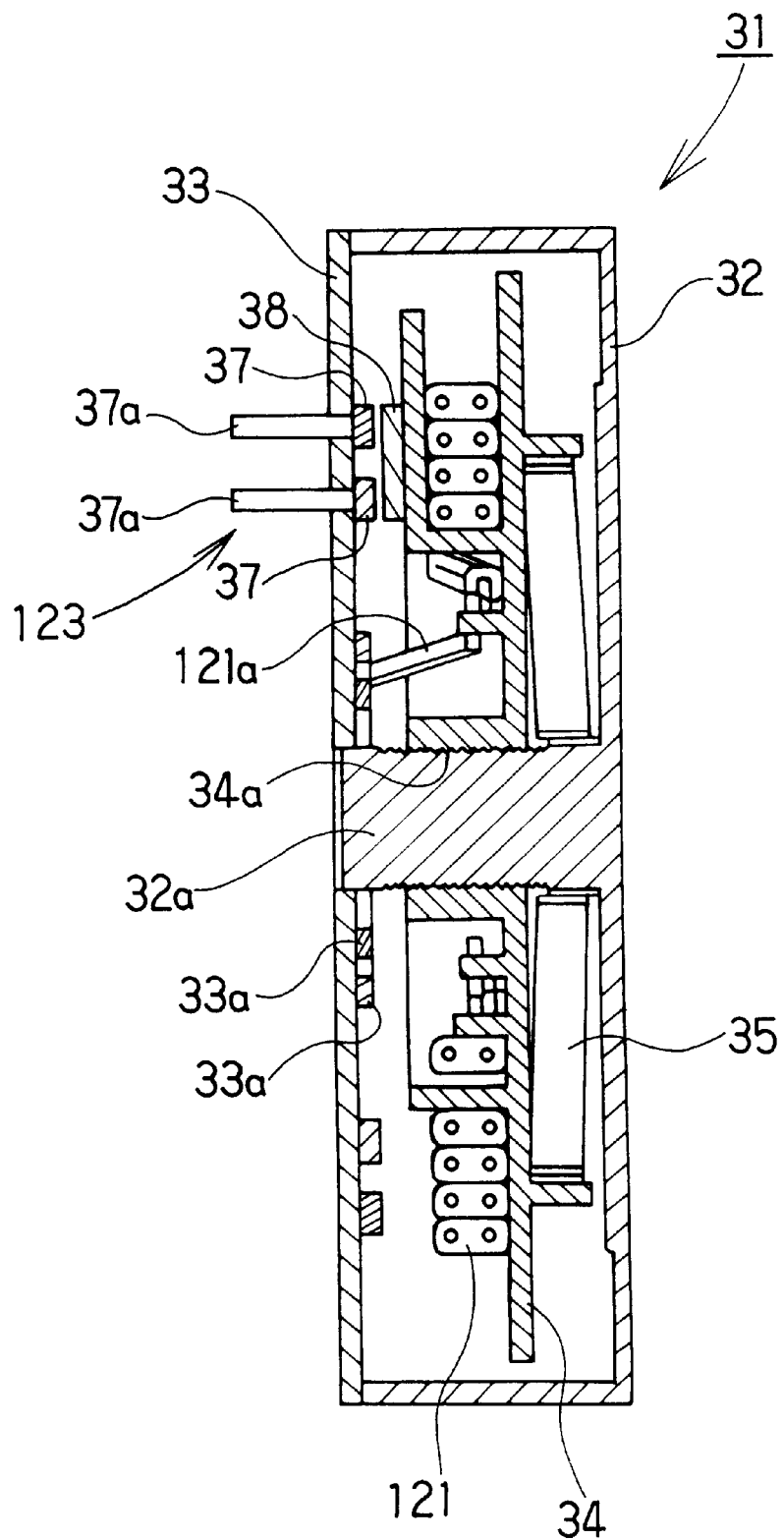
FIG. 14 is a vertical sectional view showing the cord case with a charging cord pulled out to some extent in connection with the running-performing unit of the invention.
Figure 15:
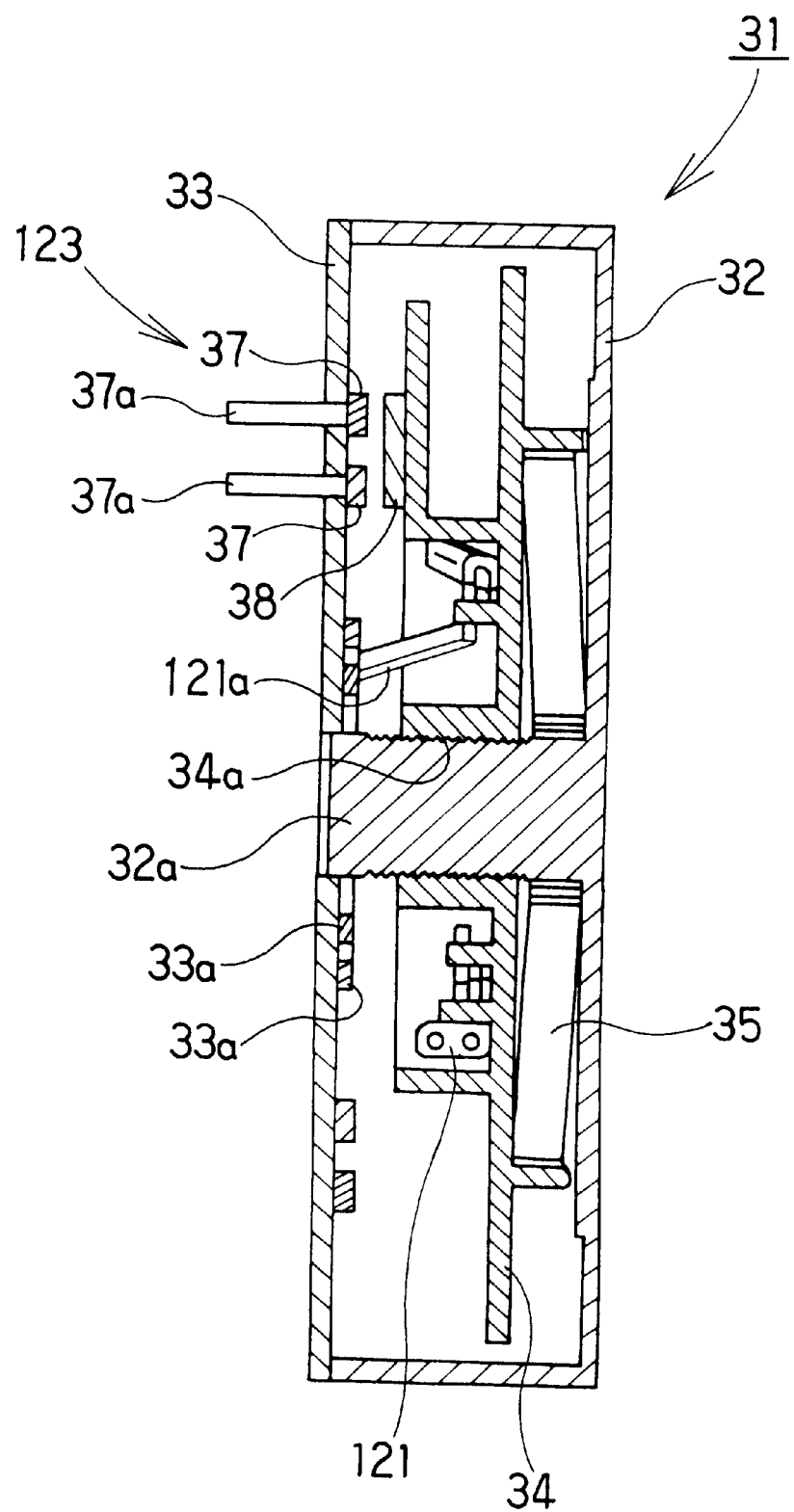
FIG. 15 is a vertical sectional view showing the cord case with a charging cord completely pulled out in connection with the running-prohibiting unit of the invention.

When the charging cord 121 in the initial state stored in the cord case 31 as shown in FIG. 13 is pulled out even to a small extent as shown in FIG. 14 or fully pulled out as shown in FIG. 15, the cord reel 34 is rotated to move from the initial state as the charging cord 121 is pulled out, and the contact switch 123 is turned off. Therefore, even when the main key switch 9 is turned on, the power supply line from the battery 13 is cut by the turn-off operation of the contact switch 123, and the drive current cannot be supplied from the battery 13 to the various circuits including the motor 7, so that the vehicle is prevented from running.

On the other hand, when the charging cord 121 is stored as predetermined to return to the initial state as shown in FIG. 13, the cord reel 34 is rotated reversely to return to the initial position as the cord is stored, and the contact switch 123 is turned on. Therefore, when the main key switch 9 is turned on, the power supply line from the battery 13 is connected, the drive current is supplied to the various circuits including the motor 7, and the vehicle becomes runnable.

If the charging cord has not been stored as predetermined, a signal indicating an unstored state can be obtained, so that this signal can be used to indicate an alarm on the display panel to attract the attention of the driver to enhance safety.

And, the circuit may be configured that by judging that the charging cord is pulled out and the vehicle is not moving, the vehicle is prohibited from running, namely the vehicle is prohibited from starting to move. In this case, the vehicle can be prevented from being disabled to run even when the charging cord is disconnected from the stored position due to some reasons when the vehicle is running.

Besides, by the movement of the cord reel which has the charging cord wound on it in the axial direction, the contact switch is turned on/off in this embodiment. But, conversely, the movement of the cord reel in the axial direction may be fixed and the shaft may be configured to be movable, and the contact switch which operates in response to the movement of the shaft may be provided.

As described above, by the running-prohibiting unit for the electric vehicle in this embodiment, the cord reel which winds the charging cord on it to store in the case is supported on the spiral-grooved shaft and reciprocally moved in the axial direction with the rotation of the cord reel as the cord is pulled out or stored, the contact switch 123 which is turned off with the movement of the reel from the initial position is disposed, and this contact switch is electrically connected in series to the power supply line from the battery to the motor at a point closer to the motor than to the charging route. Therefore, regardless of whether recharging is being made or not, the vehicle cannot be run until the charging cord is stored into the case, and sufficient safety can be secured without fail. In other words, the running-prohibiting state does not depend on the power supply from the external power source, so that the running can be prohibited with reliability even when the external power source fails or the charging cord is broken.

This embodiment has been described with the charging cord used for the electric vehicle, but not limited to it. And, it can generally be applied to electrical equipment which is not suitable or desired to be operated with the charging cord pulled out using a rechargeable battery.

Now, the running-prohibiting unit for the electric vehicle of the invention will be described with reference to an example shown in FIG. 16.

The running-prohibiting unit for the electric vehicle in this embodiment is applied only when the above-described contact switch can be used for a relatively low current due to the limitation to its cross-sectional shape. In other words, a relay switch which can use the drive current for the motor and various circuits is provided instead of the contact switch at the same position, and this relay switch is intermittently operated by a similar contact switch. But, in this second embodiment, the contact switch is turned off when the charging cord is stored and turned on when the charging cord is not stored. Therefore, when the charging cord is stored, the relay switch operates for connection to enable various ordinary operations, but by using the relay switch which does not need the operation current for this connection operation, the battery current is prevented from being consumed for the connection operation of the supply line under the ordinary runnable state.

Figure 16:
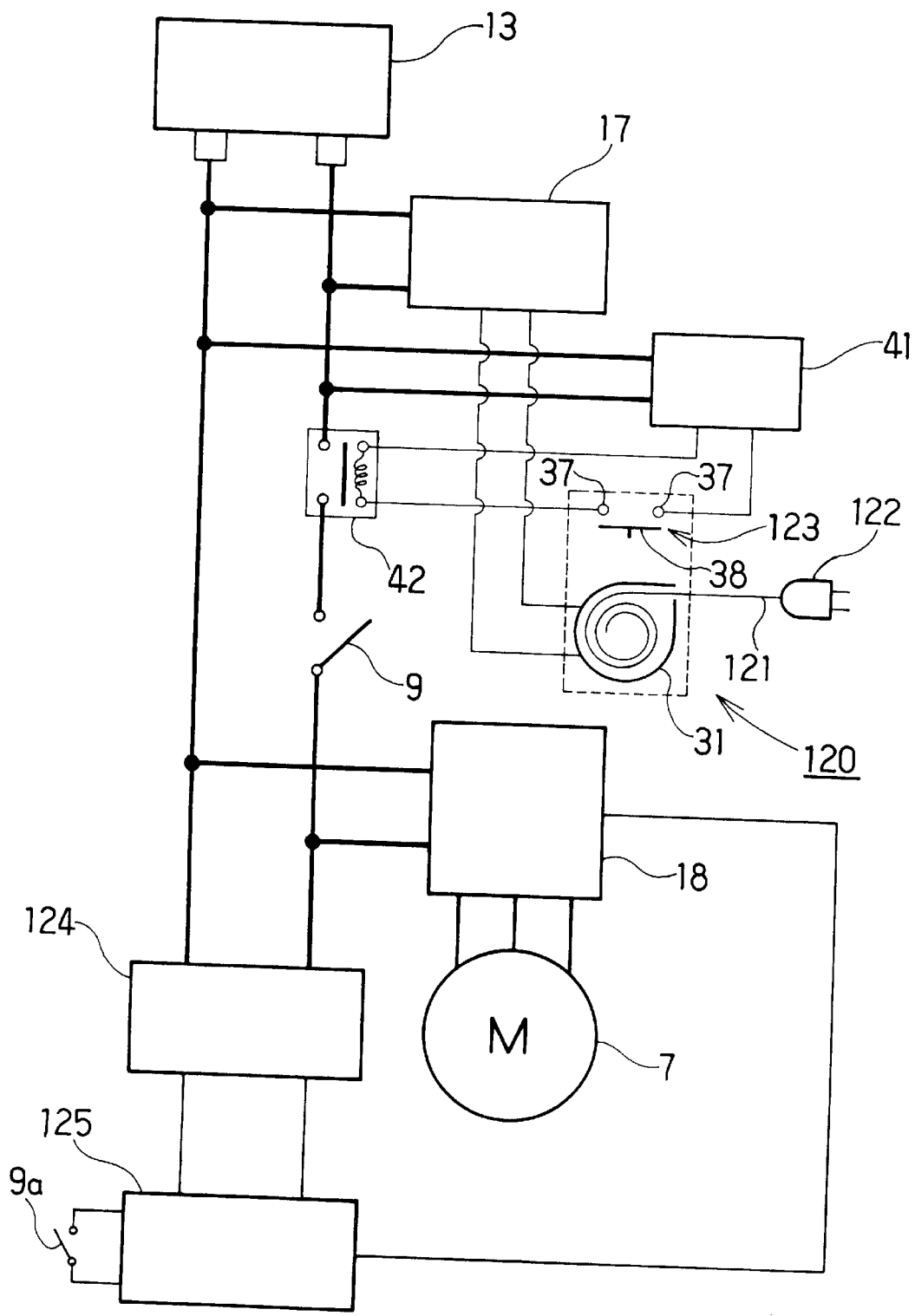
FIG. 16 is a circuit block diagram showing the general schematic structure in connection with the running-prohibiting unit of the invention.

In FIG. 16, the running-prohibiting unit 120 in this embodiment comprises the charger 17 which converts a household voltage into a battery charging voltage and is connected in parallel to the power supply line connected from the battery 13 to the motor 7 via the motor drive circuit 18, a DC/DC converter 41 which is connected in parallel to the power supply line at a point closer to the motor 7 than to the point where the charger 17 is connected, a relay switch 42 which is in supply connection with the DC/DC converter 41 and connected in series to the power supply line at a point closer to the motor 7 than to the point where the DC/DC converter 41 is connected, and the contact switch 123 for the cord case 31, which is disposed on the connection line between the relay switch 42 and the DC/DC converter 41.

The relay switch 42 makes the connection operation when the switch drive current is not supplied, and releases the connection to cut the line when the drive current is supplied.

Therefore, when the contact switch 123 of the cord case 31 is turned on with the pull out of the charging cord 121, the drive current is supplied to the relay switch 42, and the relay switch 42 provided on the power supply line makes the cutoff operation. And, even when the main switch 9 is turned on in this state, the drive current is not supplied from the battery 13 to the motor 7 and the various circuits including the motor drive circuit 18 and the motor control circuit 125, so that the electric two-wheeled vehicle 1 is prohibited from running.

As described above, the running-prohibiting unit in this embodiment has the relay switch which can use the drive current for the motor and the various circuits provided on the power supply line, which has the contact switch of the first embodiment, at the same point instead of the contact switch, and intermittently operates the relay switch by a similar contact switch, so that the contact switch can be made compact and simple, and can also be applied to a higher power supply system.

And, when this relay switch is one which does not need the operation current for its connection operation, the battery current is not consumed for the supply line connection operation in the ordinary runnable state, so that the battery use efficiency can be improved.

Now, the running-prohibiting unit for the electric vehicle of the invention will be described with reference to a third embodiment shown in FIG. 17.

The running-prohibiting unit for the electric vehicle in this embodiment does not cut directly the motor power supply line but prohibits the motor from operating by prohibiting the motor operation in view of circuitry functions, namely suppressing the motor output command from the control circuit for controlling the motor power supply, or by stopping the operation of the motor drive circuit.

Figure 17:
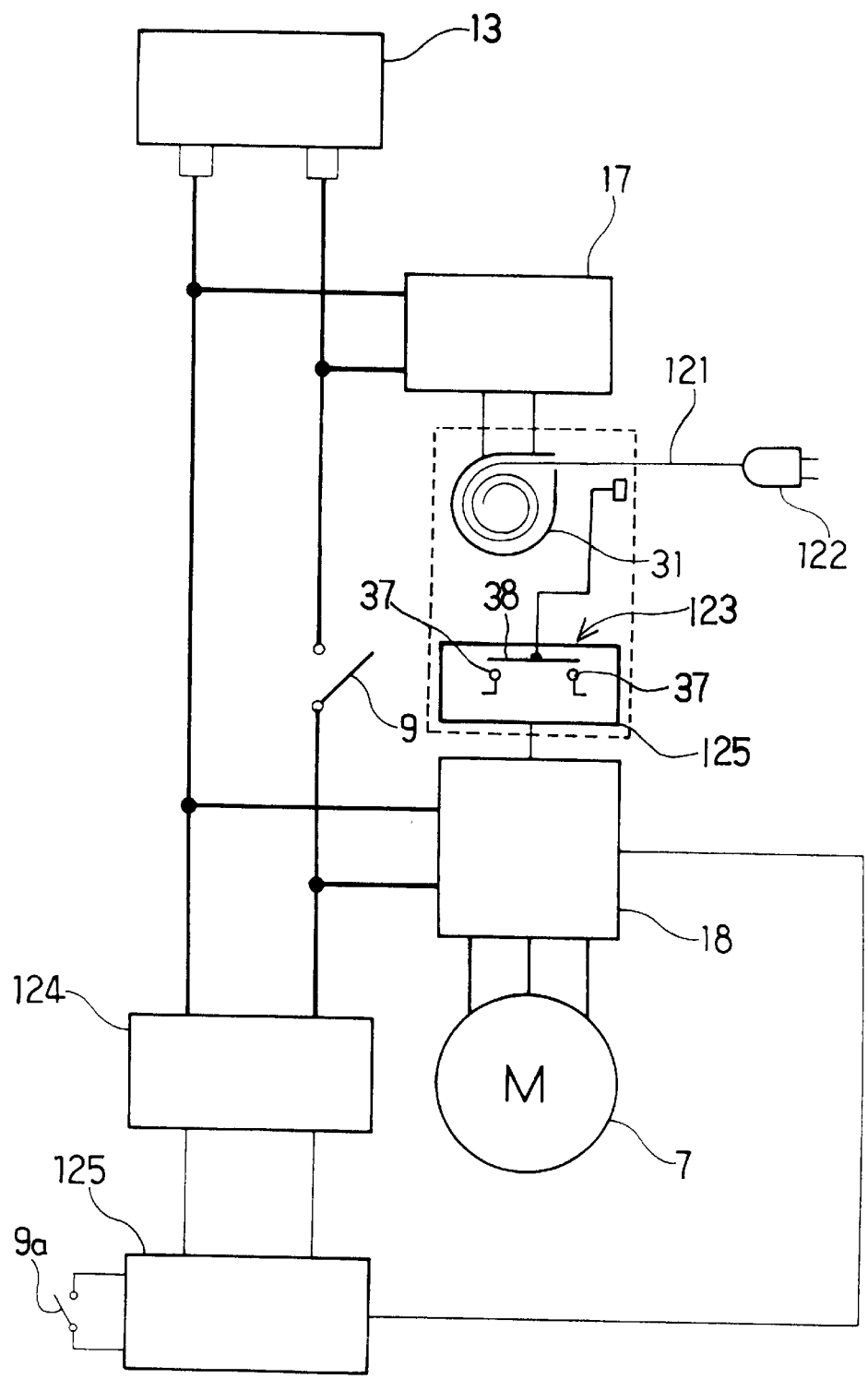
FIG. 17 is a circuit block diagram showing the general schematic structure in connection with the running-prohibiting unit of the invention.

As shown in FIG. 17, when the contact switch 123 is turned off, the running-prohibiting unit 120 in this embodiment prohibits the motor from revolving by controlling the motor drive circuit 18 by the motor control circuit 125 to make a voltage chopper have a duty ratio of 0%.

Therefore, when the contact switch 123 is turned off as the charging cord 121 is pulled out, the motor drive circuit 18 connected at the subsequent stage of the contact switch 123 is controlled to prohibit the motor from rotating, and in this state, the electric two-wheeled vehicle 1 is prohibited from running even when the main switch 9 is turned on.

The running-prohibiting unit for the electric vehicle of the invention will be described with reference to an example shown in FIG. 18. The running-prohibiting unit for the electric vehicle in the embodiment has its general circuit structure configured in the same way as in the previous embodiment, so that the description of the circuit structure will be omitted.

Figure 18:
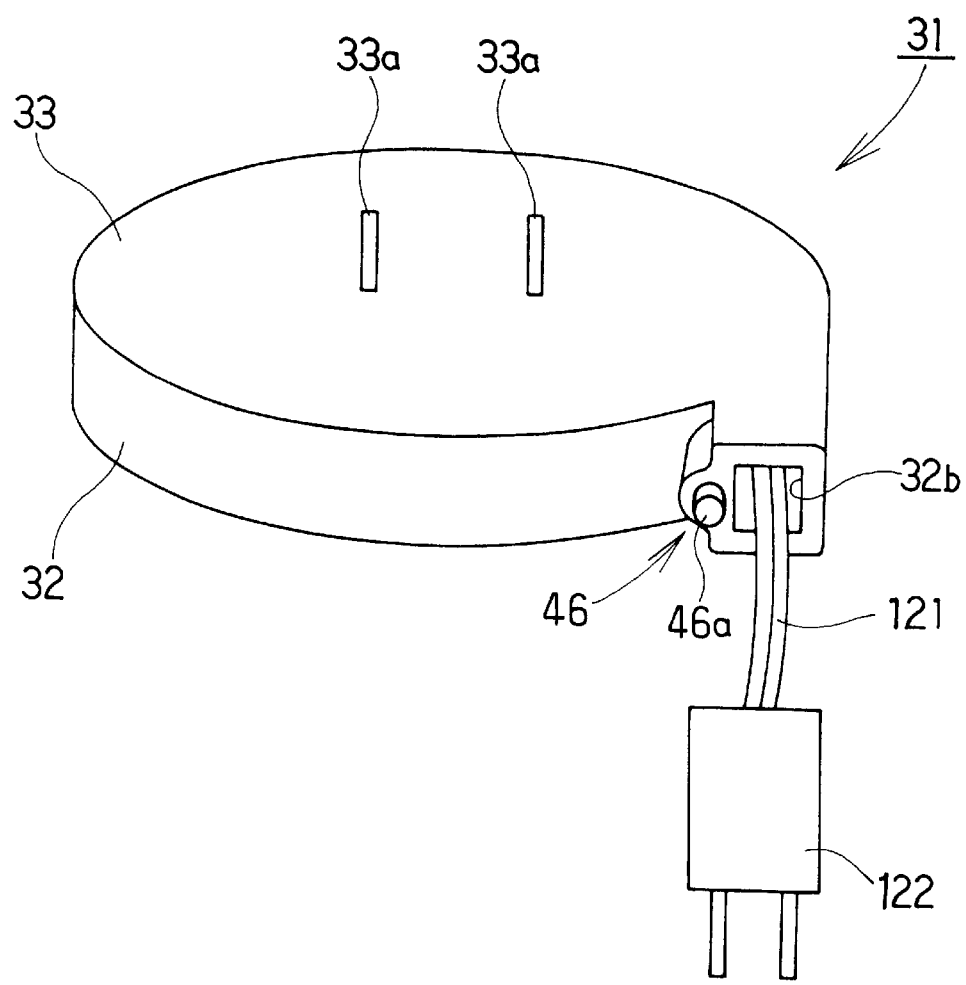
FIG. 18 is a schematic perspective view showing the main part in connection with the running-prohibiting unit of the invention.

In FIG. 18, the running-prohibiting unit utilizes the condition that when the charging cord 121 is stored, the plug 122 disposed at the leading end of the charging cord 121 is always in a predetermined position with respect to the cord case 31.

Specifically, a push-type switch 46 is provided in the neighborhood of the opening 32b of the cord case 31 with respect to the plug 122 with the cord in the stored state. The switch 46 comprises a switch operation knob 46a pushed to protrude out of the case and a contact terminal (not shown) stored within the case. And, this switch is turned on to connect the line when the switch operation knob 46a is protruded, while it is turned off to release the line connection to cut it off when the switch operation knob 46a is pushed in the case direction.

Therefore, when the charging cord 121 is pulled out of the cord case 31, the switch operation knob 46a of the switch 46 is protruded out of the case to turn on the switch 46, and the drive current is supplied from the DC/DC converter to the relay switch. As a result, the relay switch makes the shutoff operation to cut the connection of the power supply line, so that the vehicle can be prevented from running without fail when the charging cord 121 is pulled out, regardless of whether charging is made or not.

On the other hand, when the charging cord 121 is stored, the switch operation knob 46a is pressed by the plug 122 provided at the leading end of the charging cord 121 to turn off the switch 46, the drive current is stopped from being supplied to the relay switch, the relay switch releases the shutoff operation to connect the power supply line, and the vehicle can run.

A proximity sensor using a non-contact type Hall element may be provided in the neighborhood of the case opening to detect that the plug has approached the case opening, thereby judging the stored state of the charging cord 121. In this case, since the non-contact type sensor is used, a failure or malfunction due to a contact failure or the like with the use of a switch type can be avoided, and durability can be improved.

As described above, the running-prohibiting unit in this embodiment provides the same effects as in the previous embodiments, and the simple push-type switch can be provided in the neighborhood of the case opening, cost reduction and improvement of reliability can be made.

By providing perception means such as an alarm display which operates in response to a running-prohibiting signal in the non-running state in this embodiment, the pertinent state can be judged with ease.

Description will be made of a regenerative braking device for the electric vehicle of the invention with reference to an example shown in FIG. 19.

The regenerative braking device for the electric vehicle in this embodiment detects the deceleration of the vehicle owing to the mechanical braking and controls the propelling motor for the braking operation to obtain an optimum regenerative braking force with respect to the deceleration. And, the regenerative braking device in this embodiment keeps measuring the running speed and performs a computation of the speed change to determine the deceleration of the vehicle.

Figure 19:
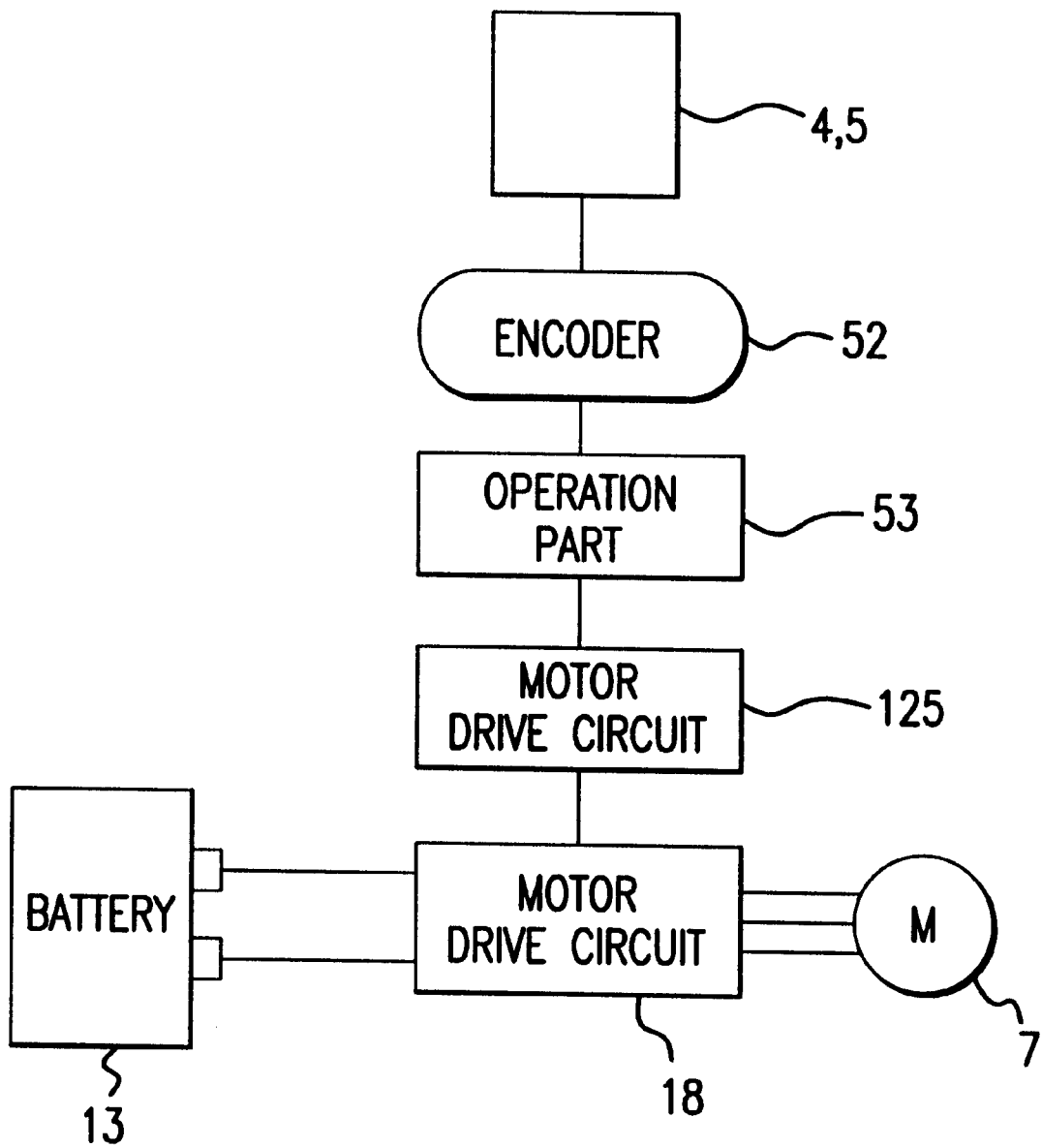
FIG. 19 is a circuit block diagram related to a regenerative braking device of the invention.

Specifically, as shown in FIG. 19, the regenerative braking device in this embodiment comprises an encoder 52 for detecting a rotational speed of the axle for rotatably supporting a propelling wheel (front wheel 4 or rear wheel 5) with respect to the vehicle body, an operation section 53 for performing a computation of the deceleration of the vehicle when the driver makes the braking operation from the detected change in the rotational speed, and a motor control circuit 125 for sending an operation command for the regenerative brake mode by the motor 7 to the motor drive circuit 18 corresponding to the deceleration operated by the operation section 53.

The encoder 52 is a general non-contact type rotational speed sensor. As the non-contact type rotational speed sensor is, for example, a photo-interrupter rotational speed sensor which is not illustrated. It comprises a detection disk which is fixed to the axle and has radial slits at predetermined intervals, and a light emitting diode and a phototransistor which are disposed on both sides of but not in contact with the disk to oppose each other. And, a pulse signal is outputted corresponding to the slits of the disk passing between them. In other words, when the luminescence from the light emitting diode reaches the phototransistor through the slits of the detection disk which rotates together with the axle, the detection signal is outputted from the phototransistor. Therefore, when the slits of the detection disk which rotates together with the axle pass between the diode and the transistor, the detection signal is outputted, a pulse waveform signal indicating the rotational speed of the wheel is entered the operation section 53 which is connected next to the encoder 52.

The operation section 53 has mainly a circuit which is configured using general logic circuit elements and performs a circuitry operation of a pulse signal indicating the rotational speed of the wheel entered from the encoder 52 to obtain the deceleration of the vehicle. Therefore, when the brake is operated, the deceleration of the vehicle is operated in real time by the operation section 53, and the operated deceleration is outputted to the subsequent motor control circuit 125.

The motor control circuit 125 has mainly a circuit which is configured of general logic circuit elements in the same way as the operation section 53 and processes an externally entered signal by the previously prepared internal processing to output an operation signal to the motor drive circuit 18. In other words, the motor control circuit 125 receives the motor output command signal from the control circuit in the ordinary running, and receives the brake operation signal and the vehicle deceleration when the brake is operated.

And, while the vehicle is running normally, a drive signal is sent to the motor drive circuit 18 corresponding to the motor output command outputted from the control circuit in accordance with the accelerator operation by the driver. On the other hand, when the regenerative brake is operated, a prescribed regenerative operation command signal determined by the internal processing is outputted to the motor drive circuit 18.

Specifically, the regenerative operation mode of the motor control circuit 125 is activated by the brake operation signal, a regenerative braking force in the regenerative operation mode is set to an optimum value based on the operated deceleration. This regenerative braking force is determined so that the mechanical braking force of the front wheel and the regenerative braking force of the rear wheel have an optimum ratio.

It is known that the general vehicle has the operation efficiency of a braking force predominantly influenced by the center of gravity of the vehicle. In other words, in the two-wheeled vehicle, the braking efficiency varies depending on the vehicle body load applied to the front and rear wheels, but a ratio of braking forces owned by the brakes of the respective wheels is desired to be set to 7:3 for the front and rear wheels. But, in the electric scooter for example, the batteries which occupy a large ratio of the structural weight are limited to be mounted at about the center of the vehicle body, so that it is hard to secure a good balance of gravitational center in the lengthwise direction of the vehicle body.

Therefore, in this embodiment, when the brake is operated, the general brake balance is controlled to ideal 7:3 with the actual gravitational center of the vehicle taken into account. Namely, the regenerative braking force was conventionally kept at a substantially constant value, while it is increased or decreased according to the deceleration and controlled to be kept an ideal brake balance of 7:3 in this embodiment. Accordingly, the value of regenerative braking force including an overall balance is determined rather than the vehicle's absolute braking force or a total braking force of the front and rear wheels. As a result, an optimum overall braking force can be secured readily for the vehicle.

And, when the brake is operated, this determined value of regenerative braking force is outputted to the motor drive circuit 18.

As described above, the motor drive circuit 18 comprises mainly the MOS-FET circuit, and its operation is controlled in accordance with a command from the motor control circuit 125. In other words, when the vehicle is running normally, the battery power supplied to the propelling motor 7 is controlled by the fast switching operation of the MOS-FET element to adjust the motor output.

On the other hand, when the regenerative brake is operated, the propelling motor 7 is connected to the battery 13, and the power generated by the propelling motor 7 which is operating as the generator is controlled in conformity with the predetermined regenerative braking force to increase or decrease the regenerative braking force. And, in the regenerative mode, the generated voltage which is relatively low from the propelling motor is raised by the motor drive circuit 18 to a level higher than the battery discharging voltage at the time and charged into the battery. For example, when it is assumed that a generated voltage of about 1.8 V is obtained, it is raised to 48 V and charged into the battery.

Now, description will be made of the operation of the regenerative braking device configured as described above.

When the mechanical brake is operated by the driver while the vehicle is running, the speed change by the mechanical brake is detected by the encoder 52, and the deceleration of the vehicle is determined by performing an operation by the operation section 53 from the detected speed change.

Then, a brake operation signal is given to the motor controlling circuit 125, and the regenerative brake mode is started according to the entered signal. In other words, the regenerative braking force is appropriately determined corresponding to the calculated deceleration, sent to the motor drive circuit 18, and the regenerative braking force by the motor is adjusted by the motor drive circuit 18.

And, if the driver judges that the braking force at the time is not sufficient and increases the brake operating quantity, the deceleration is increased accordingly, and the regenerative braking force is increased as high as possible corresponding to the deceleration. Therefore, in case of emergency, a sufficient braking force can be secured without fail.

Besides, if the mechanical brake, which is being operated, becomes defective or fails due to some causes, control can be made to increase the regenerative braking force to enhance safety. In other words, if the deceleration drops sharply when the brake operating force doe not change, the regenerative braking force can be increased to restore to the previous deceleration.

It may be structured that when the generated regenerative electric power exceeds the electric energy which can be charged into the battery, the excessive regenerative electric power is consumed by other circuit means and the motor drive circuit 18 to obtain an optimum regenerative braking force regardless of the rechargeable capacity of the battery.

And, where the vehicle body is inclined sideways like the vehicle is turning or the vehicle body is inclined forwards like the vehicle is running a downhill, an inclination sensor or the like may be provided to detect such a state, an inclination detected is added to data for operation, and an optimum regenerative braking force therefor may be redetermined. In such a case, since the regenerative braking force of the rear wheel can be increased when only the front wheel is braked, so that the vehicle can be prevented from falling due to locking of the front wheel, the stability of the vehicle body while decelerating can be improved, and sufficient safety can be secured.

Besides, when the brake operating quantity is same and the deceleration does not change, the braking force of the mechanical brake may be relieved and the braking force of the regenerative brake may be increased to increase the opportunity of operating the regenerative brake.

In addition, corresponding to the running speed of the vehicle at the operation of the brake, the regenerative braking force may be controlled variably to optimize the braking ratio of the mechanical brake and the regenerative brake. In other words, the regenerative brake is theoretically effective when the vehicle is running at a high speed, but not so effective when running at a low speed, so that the regenerative braking force may be set corresponding to the vehicle's speed range at the time of braking.

As described above, by the regenerative braking device in this embodiment, even when the mechanical brake is solely operated to brake, the regenerative brake operates automatically, so that the operation by the driver required for the braking operation as the whole is relieved.

And, since the regenerative brake keeps assisting the mechanical brake, a load upon the mechanical brake is decreased, and even when the brake is operated continuously along a downhill, the mechanical brake can be prevented from generating heat abnormally possibly disabling the operation of the brake, and safety and reliability as the braking device can be improved.

In addition, the deceleration by the front brake is detected when only the front brake is operated, and the regenerative brake of the rear wheel operates, so that the braking ratio of the front and rear wheels can be optimized, and the optimum overall braking force as the vehicle can be secured. For example, even when the front brake only is operated by an inexperienced driver, the rear brake operates at the same time, so that the braking operation is made safely in the same way as a skilled driver. And, since the regenerative braking force of the rear wheel is set to an optimum value balanced with that of the front brake, deceleration can be made safely, and running stability at deceleration can be secured fully.

Besides, since the regenerative braking force is increased depending on the braking conditions, the battery charging quantity by the regenerative brake is increased, and the trafficable distance of the vehicle can be expanded.

And, the regenerative braking device for the electric vehicle of the invention will be described with reference to an example shown in FIG. 20.

The regenerative braking device for the electric vehicle in this embodiment detects the deceleration of the vehicle by the mechanical brake and obtains an optimum regenerative braking force with respect to the deceleration in the same way as the first embodiment of the invention of FIG. 19. And, differing from the first embodiment, the deceleration of the vehicle is not determined by operating from the measured speed change, but directly obtained by an acceleration sensor.

Figure 20:
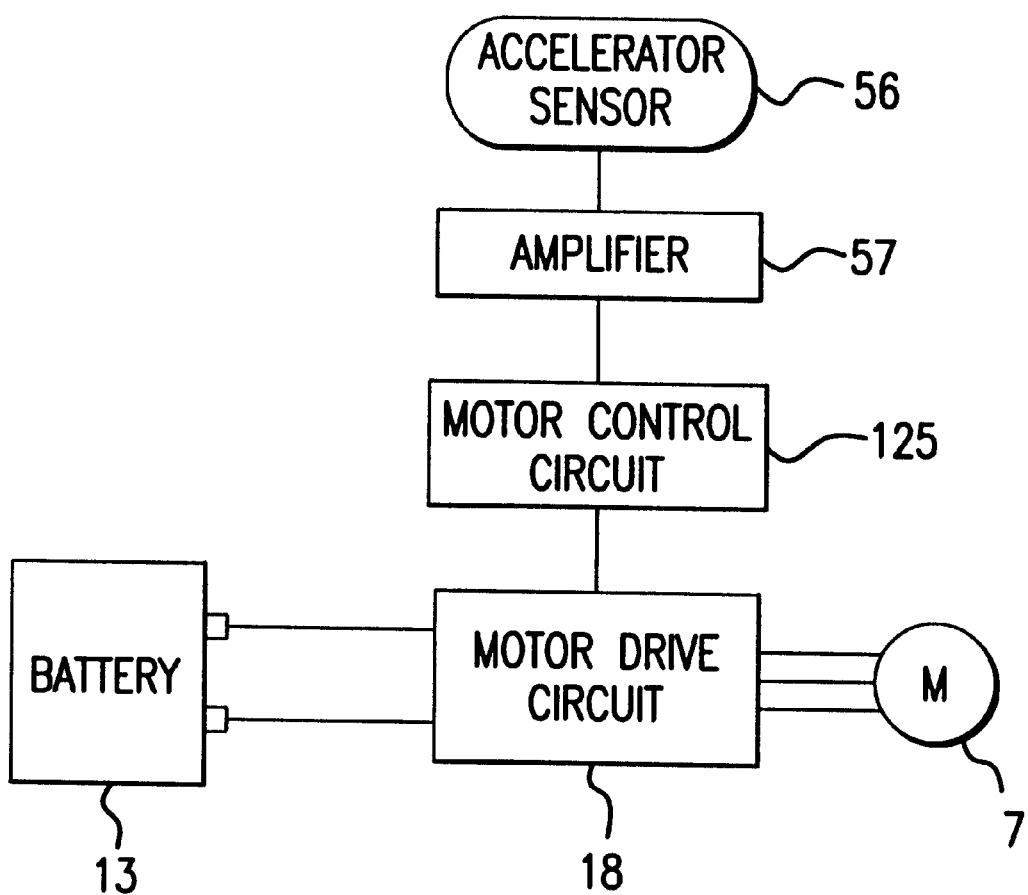
FIG. 20 is a circuit block diagram related to a regenerative braking device of the invention.

Specifically, as shown in FIG. 20, the regenerative braking device in this embodiment comprises an acceleration sensor 56 which is mounted at an appropriate point of the vehicle to detect the vehicle's speed, an amplifier 57 which amplifies a detected deceleration signal of the vehicle, and a motor control circuit 125 which outputs an operation command of the regenerative brake mode by the motor to the motor drive circuit 18 corresponding to the deceleration amplified by the amplifier 57.

The acceleration sensor 56 is a general acceleration sensor which can detect acceleration and deceleration in at least one direction, and disposed on an appropriate position of the vehicle with its detection direction in the lengthwise direction of the vehicle. Therefore, when the brake is operated, the acceleration or deceleration in the lengthwise direction of the vehicle is detected by this acceleration sensor 56, and the detected deceleration is outputted to the subsequent amplifier 57.

This amplifier 57 is formed of an element circuit having a general amplifying function, amplifies a deceleration signal to a predetermined value, and outputs the amplified deceleration to the subsequent motor control circuit 125.

When the acceleration sensor itself has an amplifying function, the amplifier can be omitted, and the circuit structure can be simplified.

The regenerative braking device configured as described above sets an optimum regenerative brake corresponding to the deceleration by the mechanical brake in the same way as in the first embodiment.

As described above, the regenerative braking device in this embodiment has the same effects as in the previous embodiments, and directly determines the deceleration of the braked vehicle by the acceleration sensor, so that detection accuracy can be improved further, and the overall braking performance can be improved by the optimum regenerative brake control.

And, differing from the previous embodiments, the circuit is simplified, and cost reduction can be made and reliability can be improved.

Besides, description will be made of another embodiment of the regenerative braking device for the electric vehicle of the invention.

The regenerative braking device for the electric vehicle in this embodiment temporarily uses the motor as a generator when the vehicle is being decelerated to convert the running kinetic energy of the vehicle into electrical energy. This regenerative braking device comprises an accelerator detection means for detecting the operation or not of the accelerator, a brake state detection means for detecting the operating state of the front and rear brakes, and a motor control circuit which is activated by an off signal from the accelerator detection means and determines an optimum regenerative braking force based on the front and rear braking force distribution detected by the brake state detection means.

The brake state detection means uses any of a sensor for detecting the tension of each brake wire, a sensor for detecting the reaction of brake levers, a piezoelectric sensor provided on the rotary spindle of brake levers, and a sensor for detecting the strokes of the front and rear suspensions.

In this embodiment, since an optimum regenerative braking force is set by detecting a braked state when the accelerator is released, detection accuracy is further improved, and overall braking performance can be improved by optimum regenerative braking control.

The above-described embodiments of the invention do not preclude one another but can be combined as required and applied to a single electric vehicle to improve overall performance of the electric vehicle.

Another embodiment of the invention will be described with reference to examples shown in FIG. 21 through FIG. 23. In this embodiment, the electric two-wheeled vehicle as the electric vehicle will be described with reference to a scooter.

In the drawings, a motor 7, a continuously variable transmission 118, a power transmission device 119 and a rear wheel 5 are mounted to a main frame 3 of a vehicle body 2 via a buffer spring 210.

Figure 21:
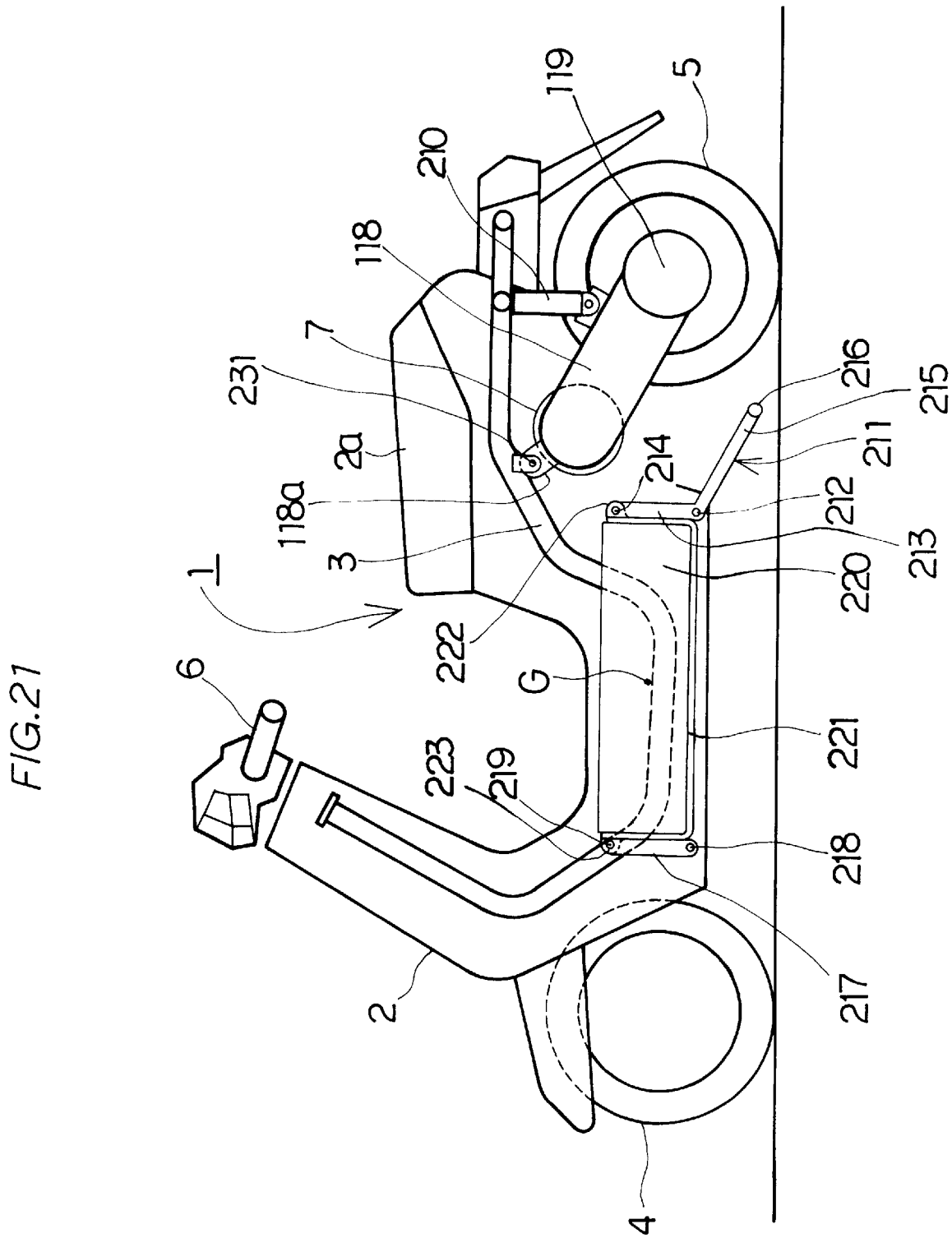
FIG. 21 is a side view showing an electric two-wheeled vehicle of the invention.
Figure 23:
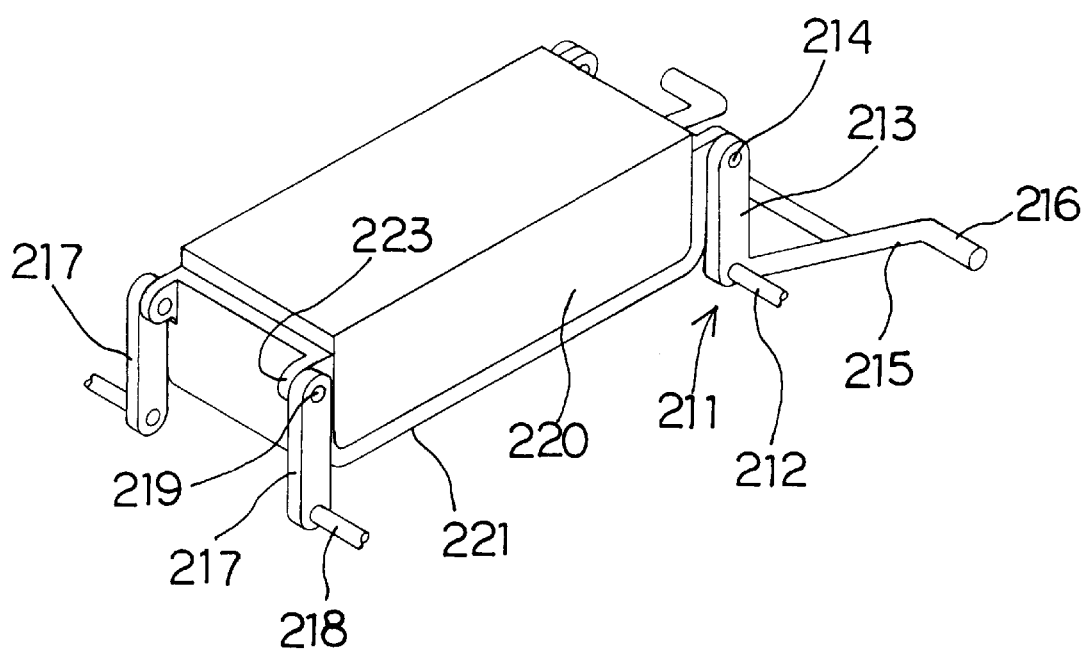
FIG. 23 is a perspective view showing a battery and a stand of the invention.

Reference numeral 211 denotes a main stand pivotally mounted on the vehicle body 2, and the main stand 211 has an L shape as shown in FIG. 21 and FIG. 23. A pivoting fulcrum 212 is provided at about the center of the main stand 211 to pivotally mount on the vehicle body 2, a pivoted member 214 is formed at the leading end of an upper arm 213 of the pivoting fulcrum 212, and a stand grounding part 216 is formed at the bottom end of a lower arm 215 of the pivoting fulcrum 212.

A support arm 217 is pivotally provided on the vehicle body 2 at a section in front of the main stand 211. The support arm 217 has at its lower end in this embodiment a pivoting fulcrum 218 which is pivotally mounted on the vehicle body 2, and a pivoted member 219 formed at the leading end of the arm above the pivoting fulcrum 218.

Reference numeral 221 denotes a battery case for storing a battery 220, and the battery case 221 has mounting members 222, 223 which are axially fitted with the pivoted members 214, 219. In the drawings, G denotes the center of gravity of the battery case 221 when the battery 220 is stored.

In the embodiment configured as described above, since the battery case 221 is pivotally mounted on the leading ends (top ends) of the main stand 211 and the support arm 217 which are pivotally provided, the battery case 221 is mounted to be movable with respect to the vehicle body 2 when the main stand 211 is erected. Thus, the pivoted members 214, 219 of the main stand 211 and the support arm 217 are provided at the tops of the pivoting fulcrums 212, 218. When the main stand 211 is erected, the pivoted members 214, 219 are slantingly moved downwards along a circular-arc trace with the pivoting fulcrums 212, 218 at the centers when the main stand 211 and the support arm 217 are pivoted as shown in FIG. 22. On the other hand, when the main stand 211 is erected, the pivoting fulcrum 212 on the main stand side is slantingly moved upwards along a circular-arc trace with the main stand grounding part 216 at the center. Therefore, the center of gravity G of the battery case 221 is moved in the lengthwise direction of the vehicle body 2.

In the electric two-wheeled vehicle provided with the stand mechanism of this embodiment, the battery case does not move upwards when the main stand is erected like prior art, so that a situation that the main stand becomes heavy with the battery weight applied on it when the stand is erected can be avoided, a load on human power to operate the stand can be relieved accordingly, and the main stand can be erected easily.

Figure 24:
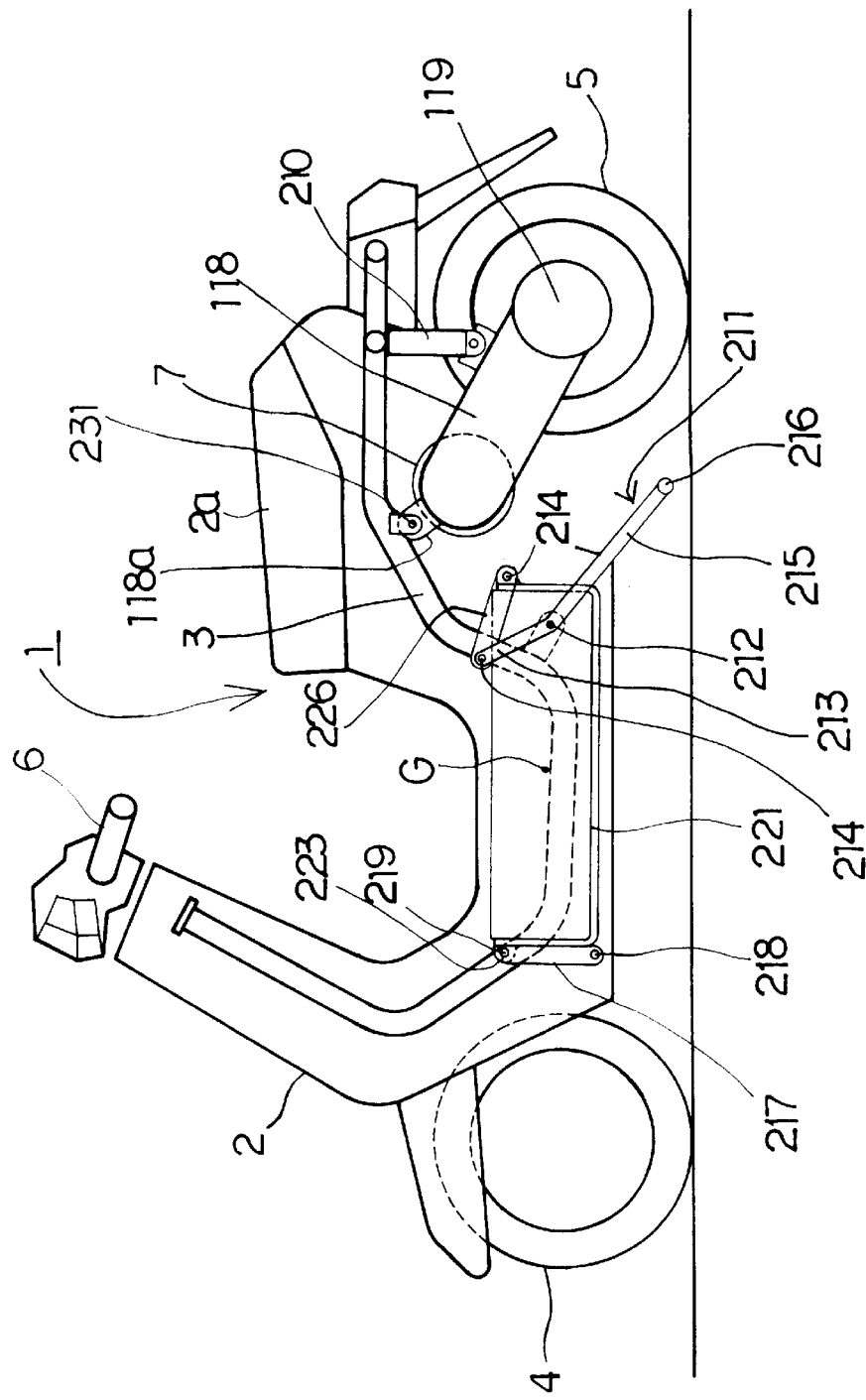
FIG. 24 is a side view showing an electric two-wheeled vehicle of the invention.

Another embodiment of the invention will be described with reference to an example shown in FIG. 24 and FIG. 25.

The main stand 211 pivotally mounted on the vehicle body has the same L shape as in the previous embodiment. The pivoting fulcrum 212 which is pivotally mounted on the vehicle body 2 is provided at the top of the main stand 211, the pivoted member 214 is formed at the leading end of the arm 213 above the pivoting fulcrum 212, and the lower end of the arm 125 below the pivoting fulcrum 212 forms the stand grounding part 216.

The support arm 217 same as in the previous embodiment is pivotally disposed on the vehicle body 2 before the main stand 211. The support arm 217 has at its lower end the pivoting fulcrum 218 which is pivotally mounted on the vehicle body 2, and the pivoted member 219 is formed at the upper end of the arm above the pivoting fulcrum 218.

The battery case 221 for storing the battery 220 has at its rear part the pivoted member 214 pivotally fitted to one end of a link 226. And, the other end of the link 226 is pivotally fitted to the pivoted member 214 above the main stand 211.

In this embodiment configured as described above, the battery case 221 is pivotally mounted on the leading ends (upper ends) of the link 226 and the support arm 217 interlinked with the main stand 211, so that the battery case 221 is disposed to move when the main stand 211 is erected.

Figure 25:
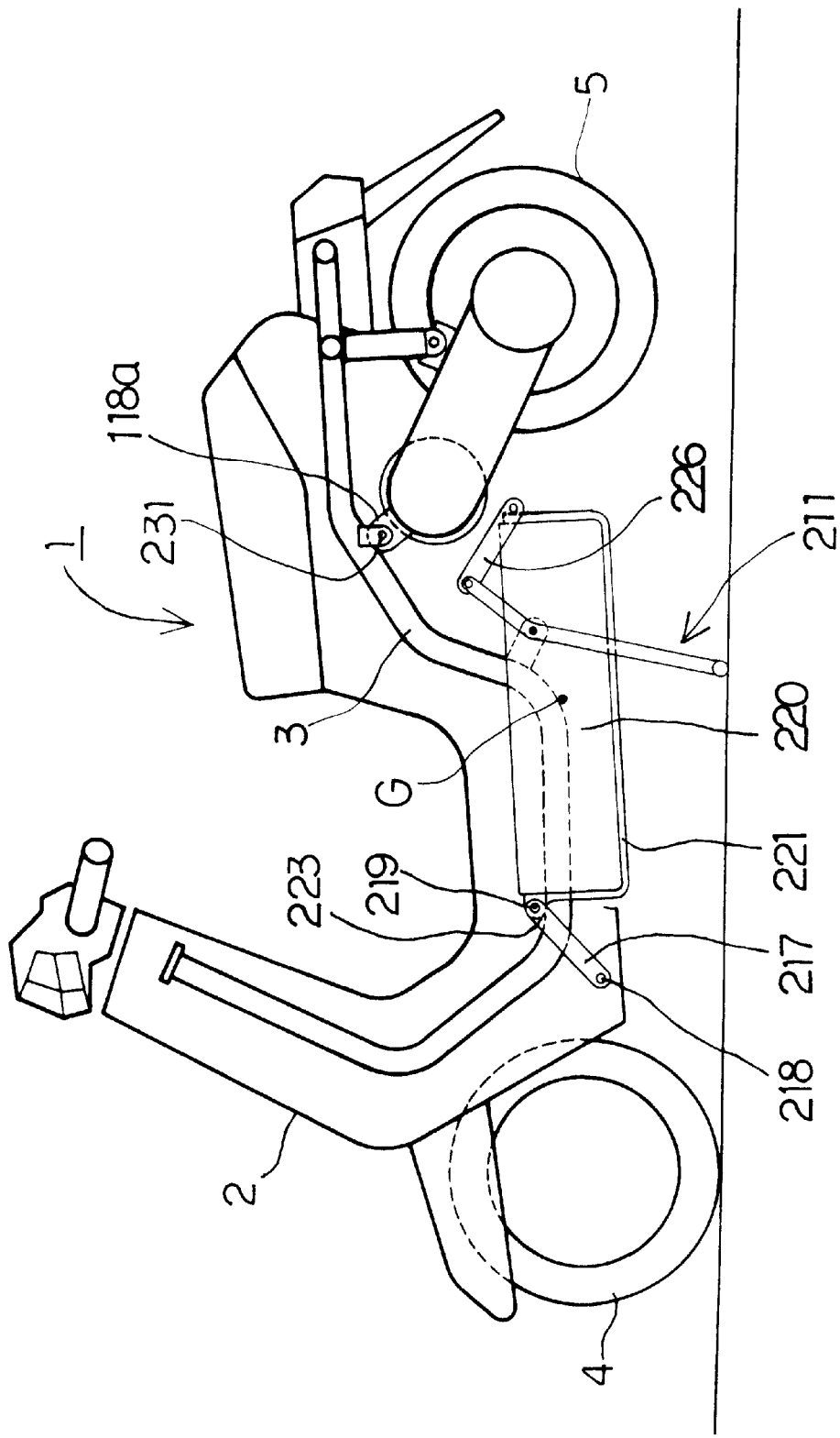
FIG. 25 is a side view showing an electric two-wheeled vehicle of the invention.

In other words, since the battery case 221 is pivotally mounted on the leading ends (upper ends) of the link 226 and the support arm 217 interlinked with the main stand 211, as shown in FIG. 25, when the main stand 211 is erected, the main stand 211, the link 226 and the support arm 217 are pivoted, the support arm 217 is slantingly moved downwards along a circular-arc trace with the pivoting fulcrum 218 at the center, and the link 226 has its one end (the end part pivotally joined with the battery case 221) moved downwards when the main stand 211 is erected. Therefore, the center of gravity G of the battery case 221 is moved in the lengthwise direction of the vehicle body 2.

In the electric two-wheeled vehicle provided with the stand mechanism of the invention, the battery case does not move upwards when the main stand is erected like prior art, so that a situation that the main stand becomes heavy with the battery weight applied on it when the stand is erected can be avoided, a load on human power to operate the stand can be relieved accordingly, and the main stand can be erected easily.

Figure 26:
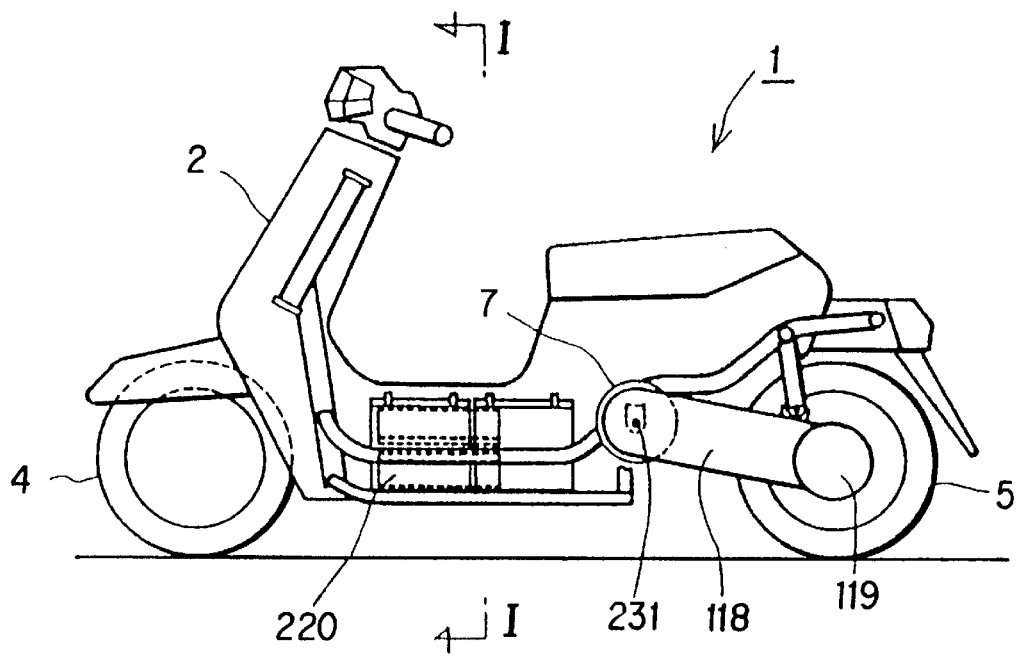
FIG. 26 is a side view showing an electric two-wheeled vehicle of the invention.

FIG. 26 is a diagram showing another embodiment of the invention. In the same way as in the previous embodiment, the drive force from the motor 7 is converted into appropriate torque by the continuously variable transmission 118, transmitted by the power transmission device 119 to rotate the rear wheel 5. And, the motor 7, the continuously variable transmission 118, the power transmission device 119 and the rear wheel 5 are mounted to the main frame 3 of the vehicle body 2 via the buffer spring 210.

Figure 22:
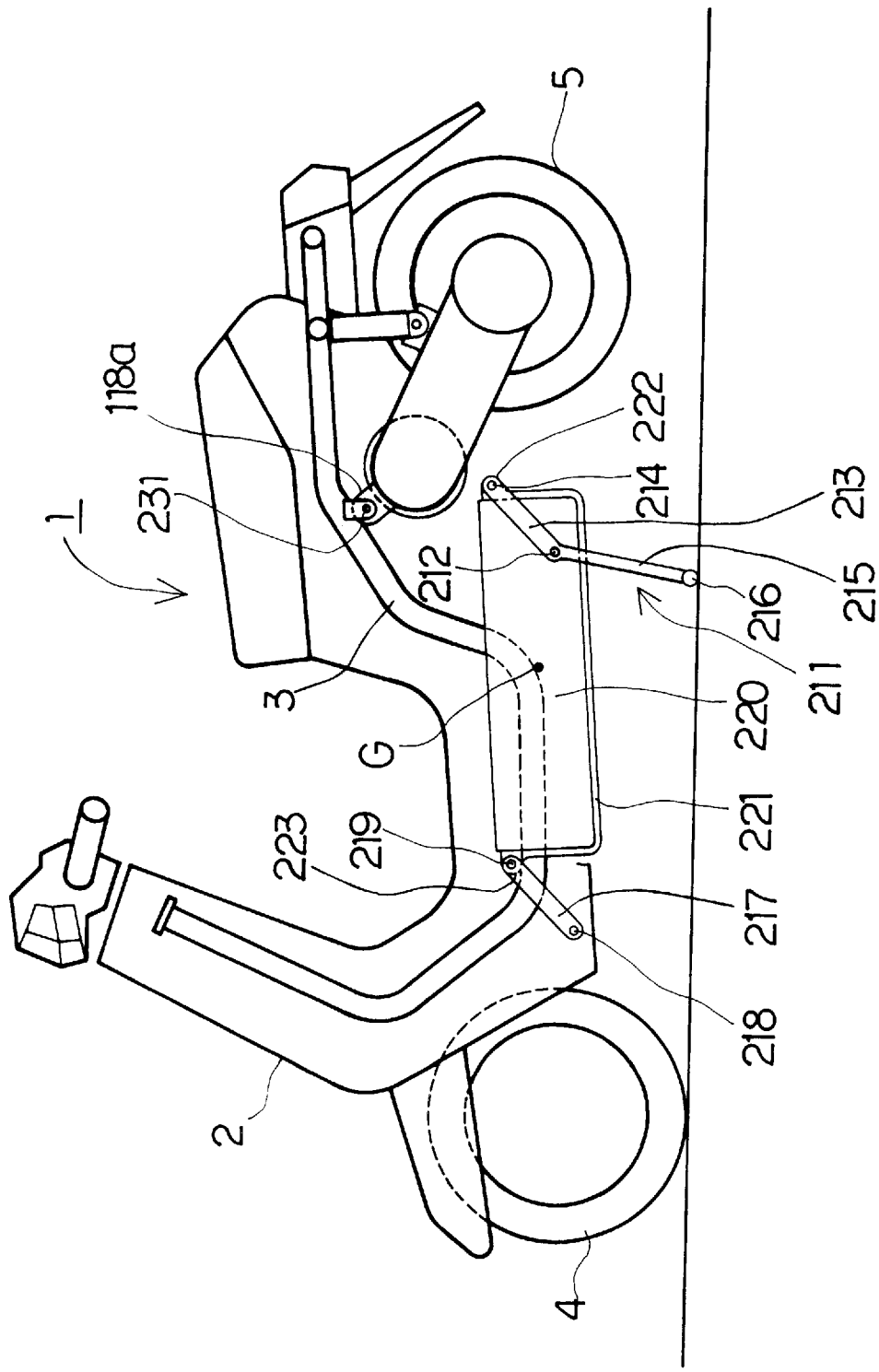
FIG. 22 is a side view showing an electric two-wheeled vehicle of the invention.

A pivot shaft 231 of the rear wheel drive mechanism shown in FIG. 21 and FIG. 22 is fitted to a support member 118a of the continuously variable transmission 118. With the pivot shaft 231 as the fulcrum, the motor 7, the continuously variable transmission 118, the power transmission device 119 and the rear wheel 5 are provided to be oscillated. In this embodiment, however, as shown in FIG. 26, the pivot shaft 231 of the rear wheel drive mechanism is mounted on the main frame 3 of the vehicle body 2, and the motor shaft of the motor 7 also serves as the pivot shaft 231, or a pivot is formed on substantially the same axis of the motor shaft.

Therefore, since the motor shaft of the motor 7 is mounted on the main frame 3 as the pivot shaft 231, the motor 7 is mounted on a spring, vibrations due to the uneven road surfaces while traveling are decreased from being directly transmitted to the motor, and reliability of the motor operation is improved. Besides, since the wheelbase can be made short, designing flexibility is improved and a turning radius is made small, so that there are advantages that the vehicle can make a small turn, and operation and handling in putting in the garage or the like are improved. And, the number of mounted batteries can be increased instead of shortening the wheelbase.

Figure 27:
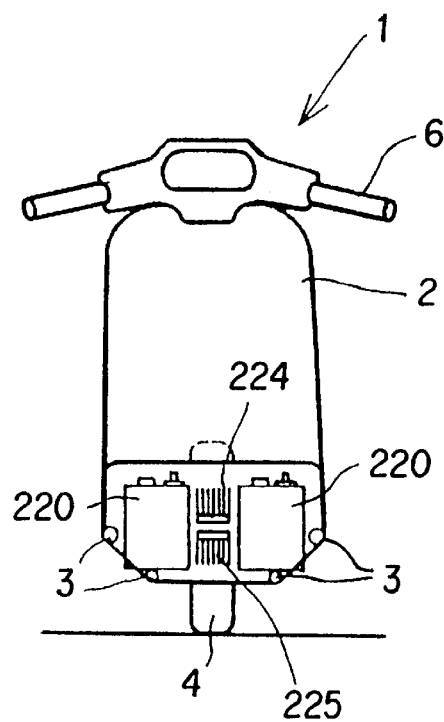
FIG. 27 is a sectional view of an electric two-wheeled vehicle taken along line I—I of FIG. 26 of the invention.
Figure 28:
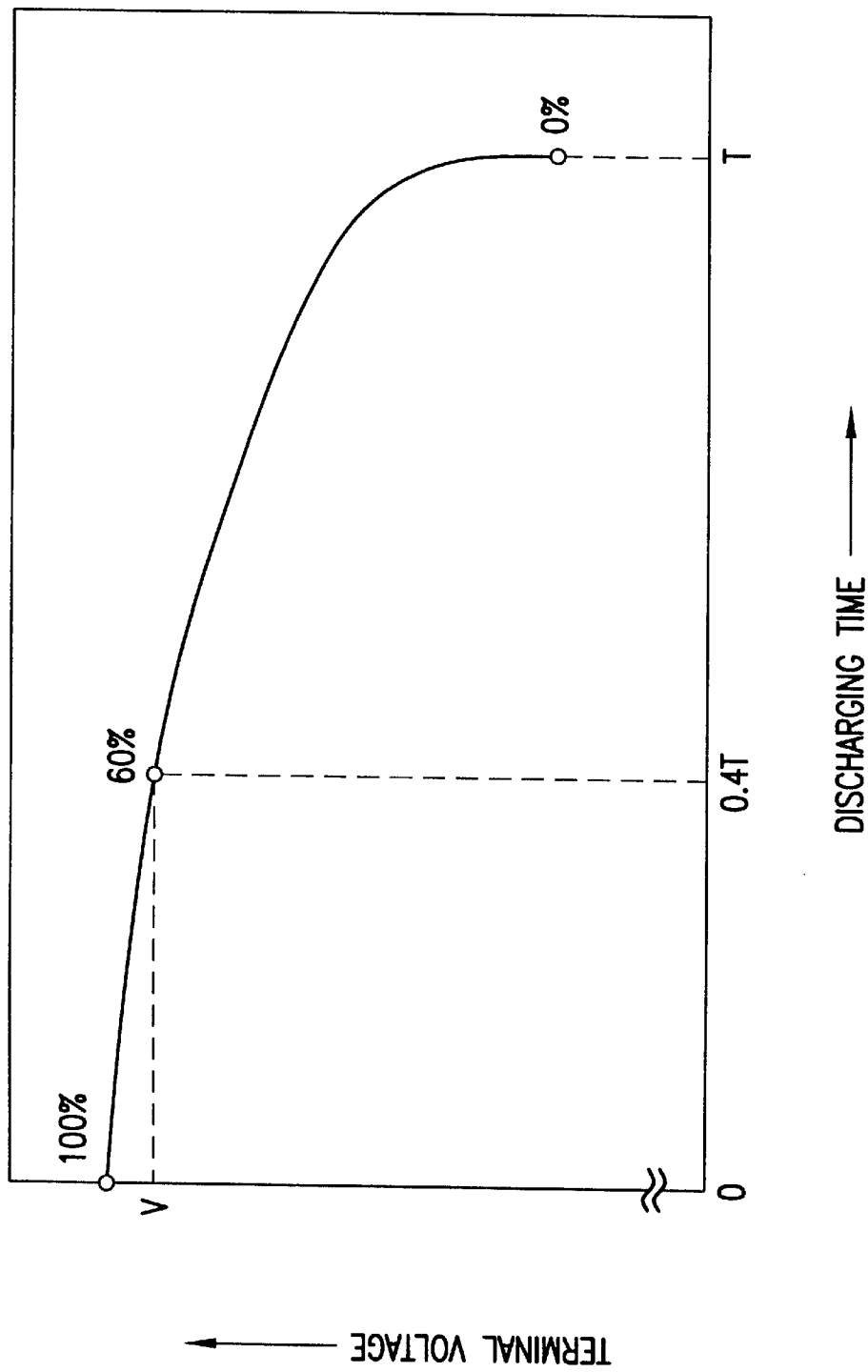
FIG. 28 is a graph showing discharge characteristics of a general battery with a constant current.
Figure 29:
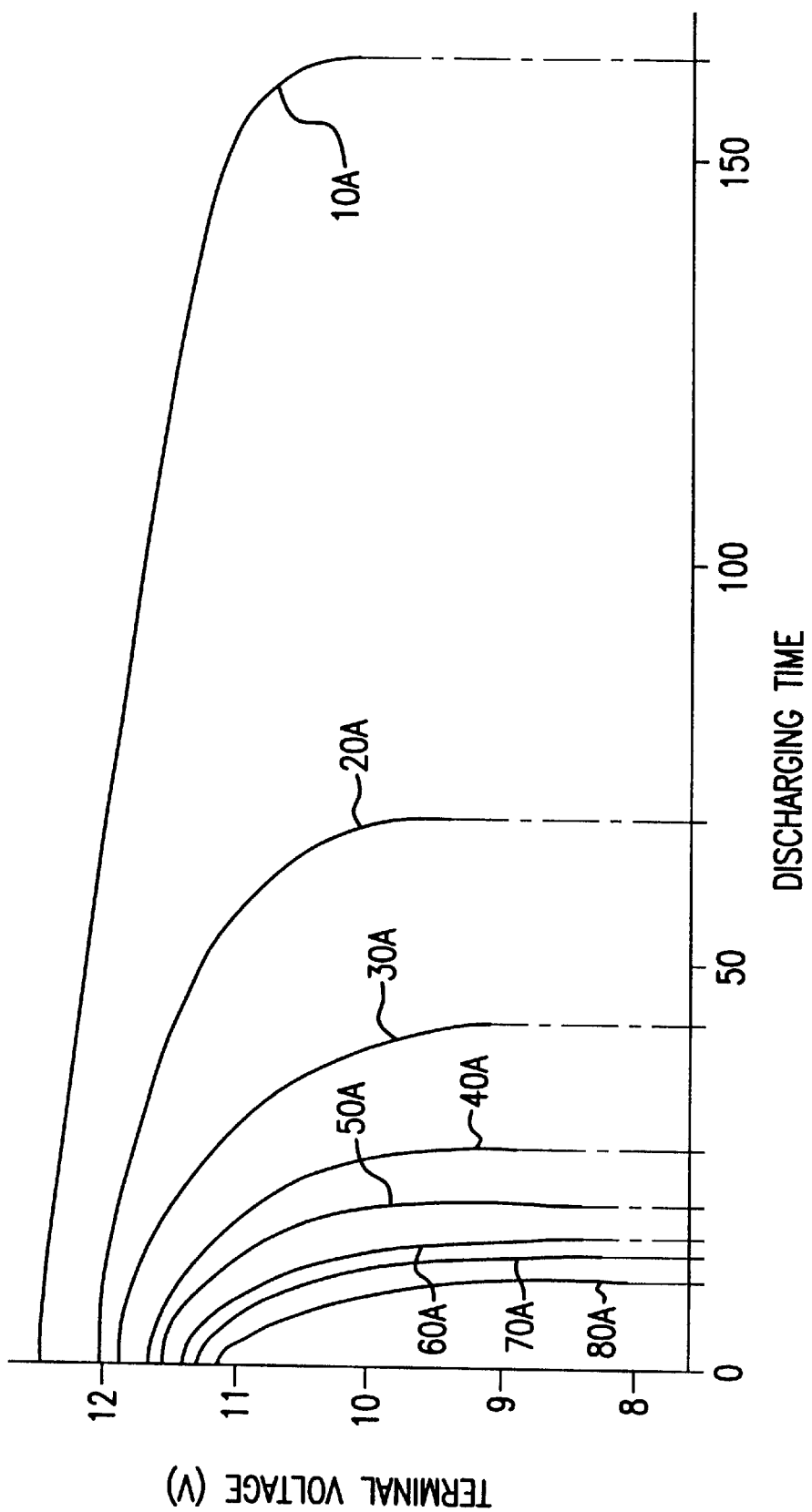
FIG. 29 is a graph showing the relation between a discharge current value and a dischargeable capacity of a battery.
Figure 30:
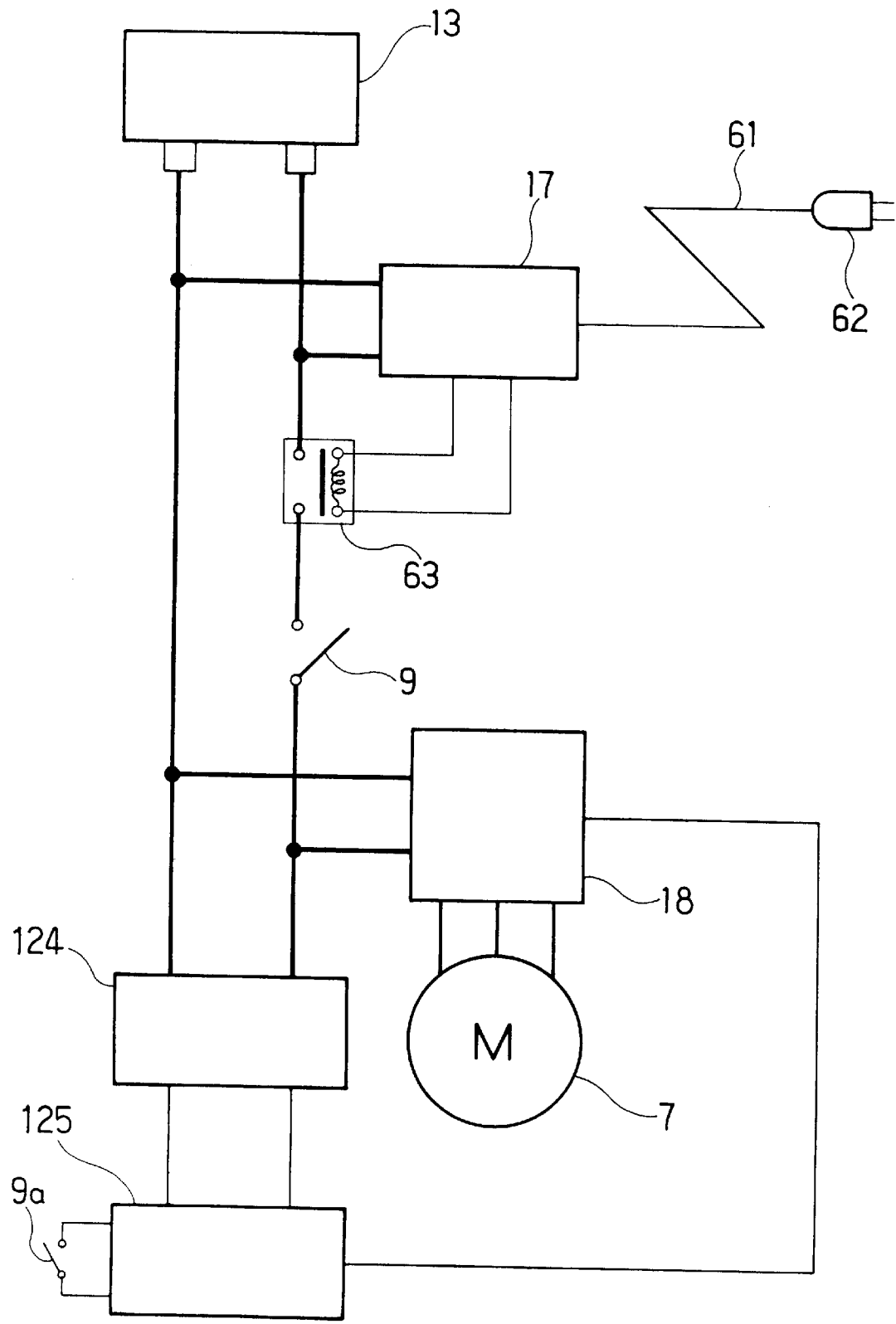
FIG. 30 is a circuit block diagram showing the general schematic structure in connection with the running-prohibiting unit of a conventional electric vehicle.
Figure 31:
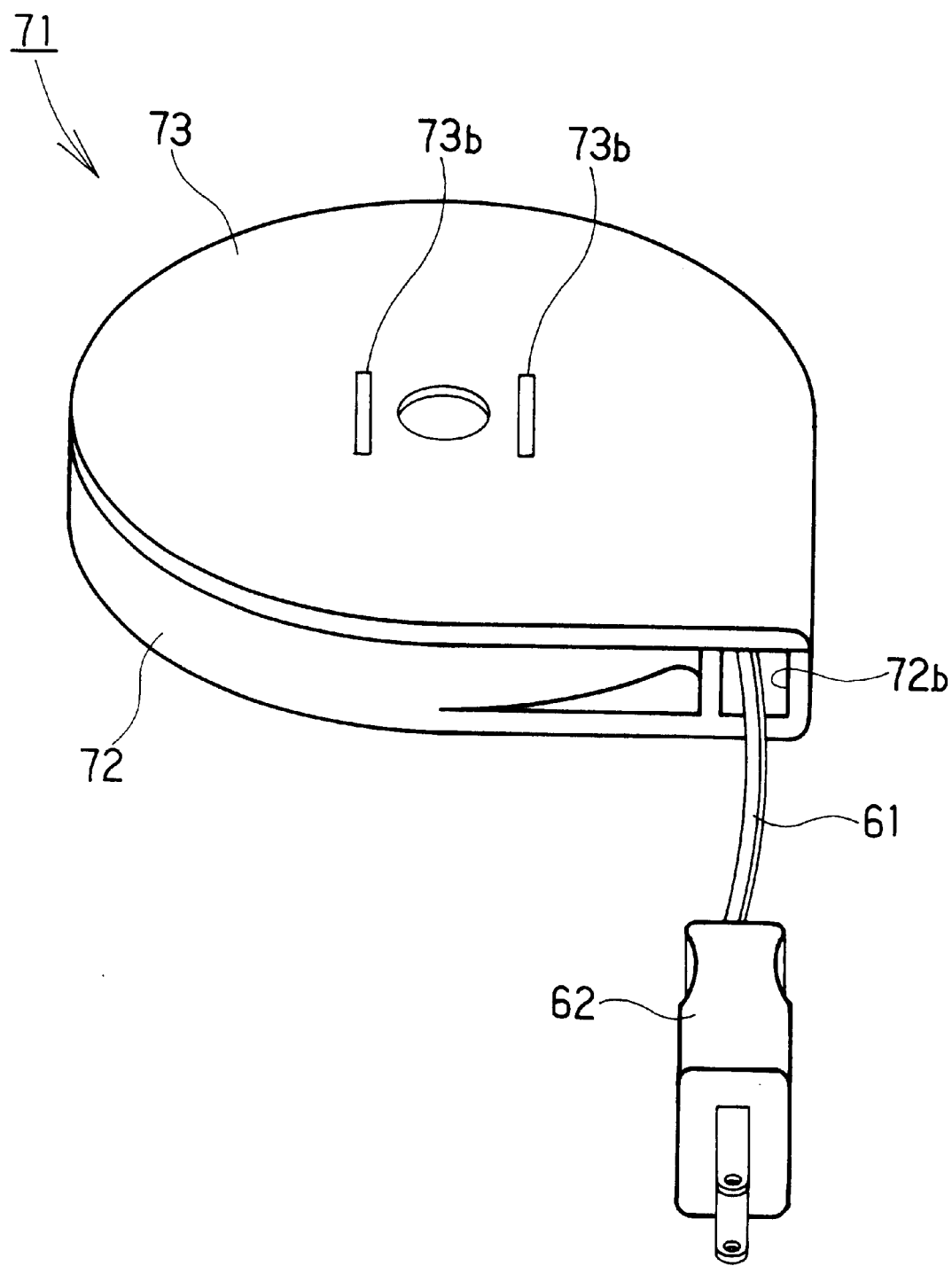
FIG. 31 is a perspective view schematically showing a conventional cord case for housing a charging cord.
Figure 32:
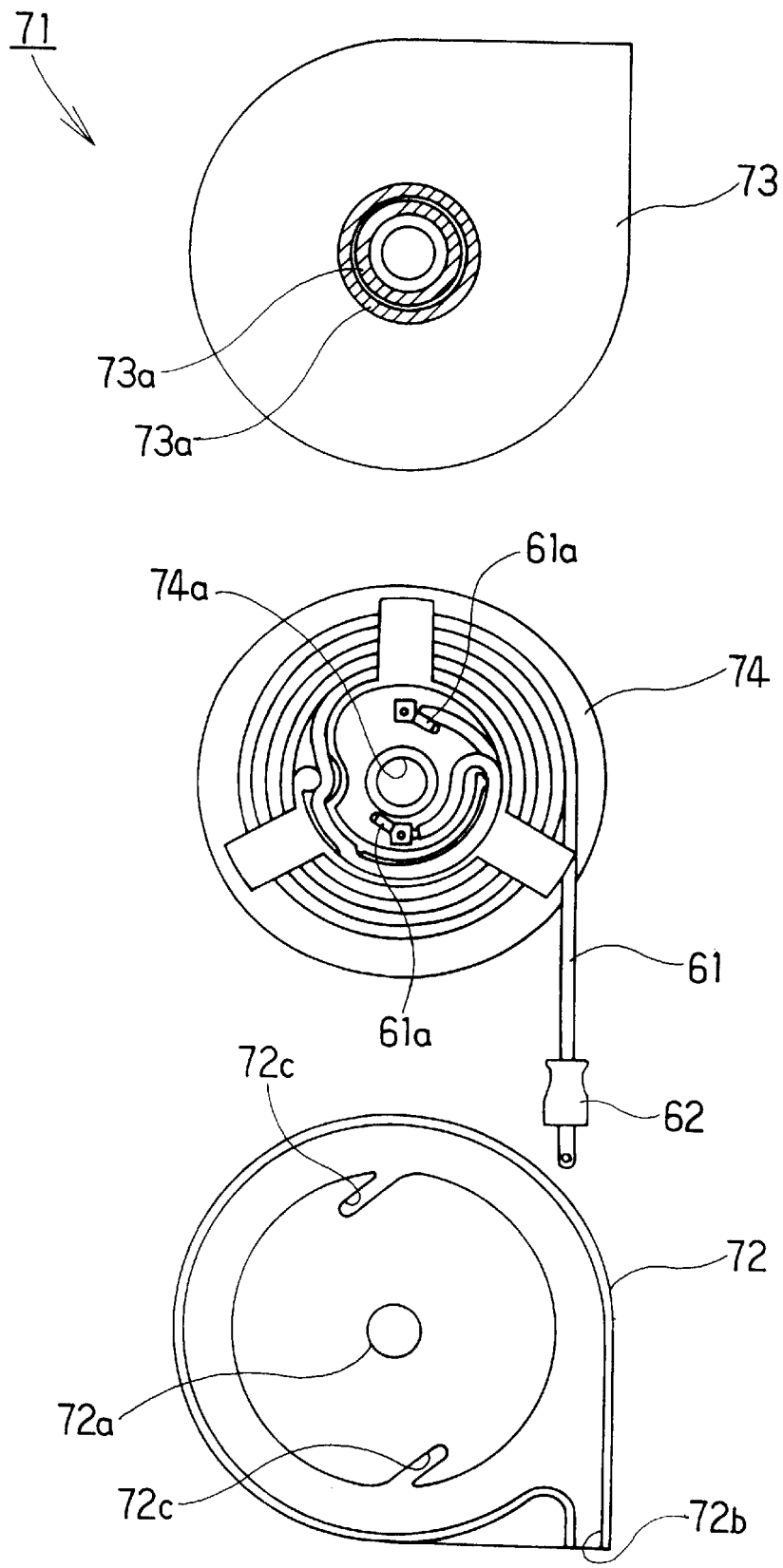
FIG. 32 is an exploded view of a conventional cord case.
Figure 33:
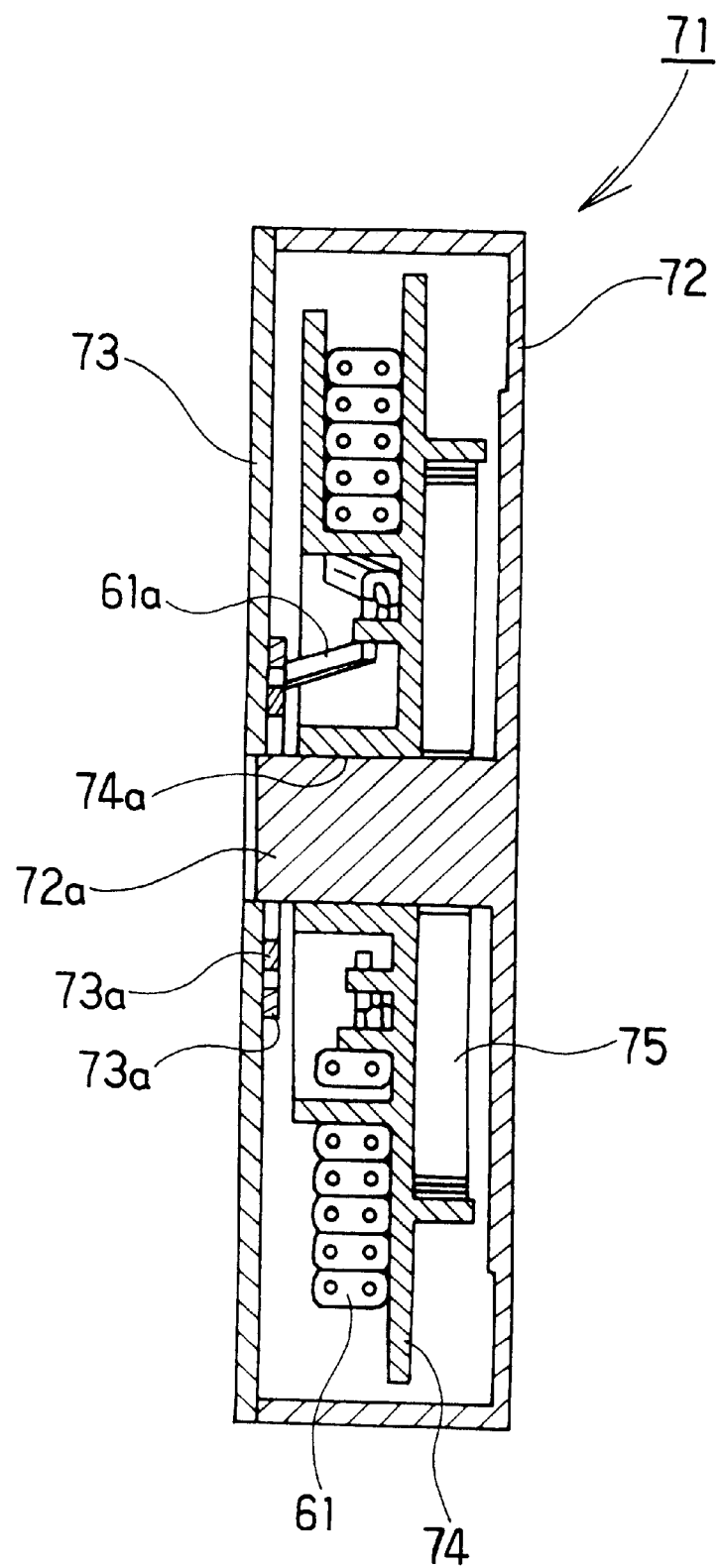
FIG. 33 is a vertical sectional view of a conventional cord case.

In addition, as shown in FIG. 27, a motor drive circuit 225 having a charger 224 and an inverter is disposed at the center of the vehicle body 2, and the batteries 220, 220 are provided on both sides of the charger 224 and the motor drive circuit 225.

Thus, since the charger 224 and the motor drive circuit 225 are provided at the center of the vehicle body 2 and the batteries 220, 220 are mounted on their both sides, when either the charger 224 or the motor drive circuit 225 operates and generates heat, the generated heat is uniformly conducted to all the batteries 220 for effective heat radiation. Therefore, respective batteries are uniformly heated and, therefore, the discharging performance of the batteries as the whole can be made uniform, and the charging and discharging capacity of the battery unit can be improved. And, since the batteries are provided on both sides, they can be removed from side for replacement, and workability can be improved.

INDUSTRIAL APPLICABILITY

The present invention can be applied to general electric vehicles such as an electric two-wheeled vehicle, and also to three-wheeled and four-wheeled vehicles and others.

We claim:

1. A battery control system for an electric vehicle which includes a propelling motor and an electric power unit for driving the motor, comprising;

a set of coupled-batteries forming the electric power unit, the set of coupled-batteries being formed of a plurality of discrete batteries connected in series and outputting a predetermined motor voltage;

a plurality of selection switches provided corresponding in number to the discrete batteries to selectively connect one of the discrete batteries in parallel to a control circuit;

judging means for determining a state of electric energy possessed by each of the discrete batteries;

control means for selecting one of the discrete batteries having a maximum energy based on the state of electric energy as determined by said judging means, and activating the corresponding selection switch accordingly; and a control stabilization circuit provided between the selection switches and the control circuit to stabilize a voltage from the selectively connected discrete battery to the control circuit.

2. A battery control system for an electric vehicle according to claim 1, wherein the judging means determines the state of electric energy in view of output terminal voltages of the respective batteries.

3. A battery control system for an electric vehicle according to claim 1, wherein the judging means makes the determining process on a predetermining time basis.

4. A battery control system for an electric vehicle according to claim 1, wherein the set of coupled-batteries is formed of a plurality of groups of batteries, each group consisting of a plurality of batteries.

5. A battery control system for an electric vehicle according to claim 1, wherein the judging means determines the state of electric energy in view of remaining capacities of the respective batteries.

6. A battery control system for an electric vehicle according to claim 1, wherein the control means makes the selecting and activating process on a predetermined time basis.

* * * * *